United States Patent
Zhang et al.

(10) Patent No.: US 11,038,567 B2
(45) Date of Patent: Jun. 15, 2021

(54) ADAPTIVE AUTONOMOUS UPLINK COMMUNICATION DESIGN

(71) Applicant: QUALCOMM Incorporated, San Diego, CA (US)

(72) Inventors: Xiaoxia Zhang, San Diego, CA (US); Kapil Bhattad, Bangalore (IN); Jing Sun, San Diego, CA (US); Qingjiang Tian, San Diego, CA (US); Srinivas Yerramalli, San Diego, CA (US); Tamer Kadous, San Diego, CA (US); Yongbin Wei, La Jolla, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/241,747

(22) Filed: Jan. 7, 2019

(65) Prior Publication Data

US 2019/0229788 A1   Jul. 25, 2019

(30) Foreign Application Priority Data

Jan. 23, 2018   (IN) .............................. 201841002660

(51) Int. Cl.
*H04B 7/04* (2017.01)
*H04B 7/0456* (2017.01)
(Continued)

(52) U.S. Cl.
CPC ......... *H04B 7/0482* (2013.01); *H04B 7/0639* (2013.01); *H04L 1/0003* (2013.01);
(Continued)

(58) Field of Classification Search
CPC ... H04B 7/0482; H04B 7/0639; H04L 1/0003; H04L 1/0009; H04L 1/0023;
(Continued)

(56) References Cited

U.S. PATENT DOCUMENTS

| | | | | |
|---|---|---|---|---|
| 7,804,850 B2 * | 9/2010 | Sebire | ................... | H04W 28/02 |
| | | | | 370/468 |
| 10,231,131 B2 * | 3/2019 | Zhang | ................... | H04W 16/14 |

(Continued)

OTHER PUBLICATIONS

Ericsson: "Summary of 90b-LTE-20 Email Discussion on AUL HARQ Design," 3GPP Draft, R1-1720540, 3rd Generation Partnership Project (3GPP), Mobile Competence Centre, 650, Route Des Lucioles, F-06921 Sophia-Antipolis Cedex, France, vol. RAN WG1, No. Reno, US, Nov. 27, 2017-Dec. 1, 2017, Nov. 17, 2017 (Nov. 17, 2017), 11 Pages, XP051369033, Retrieved from the Internet: URL: http://www.3gpp.org/ftp/tsg%5Fran/WG1%5FRL1/TSGR1%5F91/Docs/ [retrieved on Nov. 17, 2017].

(Continued)

*Primary Examiner* — Freshteh N Aghdam
(74) *Attorney, Agent, or Firm* — Liem T. Do

(57) ABSTRACT

Wireless communications systems and methods related to performing adaptive autonomous uplink (UL) communications are provided. A first wireless communication device receives, from a second wireless communication device, an autonomous uplink transmission configuration. The first wireless communication device determines a transmission parameter in response to a link adaptation parameter based on the autonomous uplink transmission configuration. The first wireless communication device transmits, to the second wireless communication device, an autonomous uplink communication signal based on the determined transmission parameter.

33 Claims, 15 Drawing Sheets

(51) Int. Cl.
- *H04B 7/06* (2006.01)
- *H04L 1/00* (2006.01)
- *H04L 1/16* (2006.01)
- *H04W 74/08* (2009.01)
- *H04L 5/00* (2006.01)
- *H04W 72/04* (2009.01)

(52) U.S. Cl.
CPC .......... *H04L 1/0009* (2013.01); *H04L 1/0023* (2013.01); *H04L 1/1607* (2013.01); *H04L 5/0098* (2013.01); *H04W 74/085* (2013.01); *H04W 72/0413* (2013.01); *H04W 74/08* (2013.01)

(58) Field of Classification Search
CPC .. H04L 1/1607; H04L 5/0098; H04W 74/085; H04W 72/0413; H04W 74/08
See application file for complete search history.

(56) References Cited

U.S. PATENT DOCUMENTS

| | | |
|---|---|---|
| 2017/0034845 A1 | 2/2017 | Liu et al. |
| 2019/0150184 A1* | 5/2019 | Golitschek Edler von Elbwart .................. H04W 8/24 370/329 |
| 2019/0208540 A1* | 7/2019 | Kim .................... H04W 74/006 |
| 2019/0230578 A1* | 7/2019 | Karaki ............. H04W 72/1242 |

OTHER PUBLICATIONS

Intel Corporation: "Remaining Details for Resource Allocation for Autonomous Uplink Transmissions," 3GPP Draft, R1-1720027, 3rd GenerationPartnership Project (3GPP), Mobile Competence Centre, 650, Route Des Lucioles, F-06921 Sophia-Antipolis Cedex, France, vol. RAN WG1, No. Reno, Nevada, USA, Nov. 27, 2017-Dec. 1, 2017, Nov. 18, 2017 (Nov. 18, 2017), 3 Pages, XP051369709, Retrieved from the Internet: URL: http://www.3gpp.org/ftp/tsg%5Fran/WG1%5FRL1/TSGR1%5F91/Docs/ [retrieved on Nov. 18, 2017].

International Search Report and Written Opinion—PCT/US2019/012681—ISA/EPO—dated Mar. 26, 2019.

\* cited by examiner

ADAPTIVE AUTONOMOUS UPLINK COMMUNICATION DESIGN

CROSS REFERENCE TO RELATED APPLICATIONS

The present application claims priority to and the benefit of India Patent Application No. 201841002660, filed Jan. 23, 2018, which is hereby incorporated by reference in its entirety as if fully set forth below and for all applicable purposes.

TECHNICAL FIELD

This application relates to wireless communication systems and methods, and more particularly to performing adaptive autonomous uplink (UL) communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

In a radio access network such as an NR network, a BS may determine schedules and allocate resources for communications with UEs in the network. For example, when the BS has downlink (DL) data for a UE, the BS may issue a DL grant for the UE and transmit the DL data based on the issued DL grant. When a UE has UL data ready for transmission to the BS, the UE may transmit a scheduling request (SR) to the BS. In response, the BS may issue an UL grant for the UE. Subsequently, the UE may transmit the UL data to the BS based on the issued UL grant. The SR and grant-based procedure can cause certain transmission delays for UL communications.

When the network operates in a shared medium (e.g., an unlicensed spectrum in sub-6 GHz bands), collisions may occur among nodes sharing the medium. One approach to avoiding collisions is to perform listen-before-talk (LBT) or clear channel assessment (CCA) to ensure that the shared channel is clear before accessing the channel. In other words, a BS may only schedule or issue a transmission grant after gaining access to the channel. Thus, spectrum sharing can cause additional transmission delays.

One approach to reducing UL transmission delays is to allow UEs to transmit data to the BS autonomously without receiving a UL grant from the BS. For example, MulteFire (MF), Future enhanced License Assisted Access (FeLAA), and NR may support autonomous UL communications. For autonomous UL communications, a BS may provide one or more UEs with a configuration allowable for autonomous UL communications. Autonomous UL communication configurations are relatively static or updated at a relatively slow time scale. However, the quality of a radio link or a channel is time-varying. Thus, the performance of autonomous UL communications may be limited.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first wireless communication device from a second wireless communication device, an autonomous uplink transmission configuration; determining, by the first wireless communication device, a transmission parameter in response to a link adaptation parameter based on the autonomous uplink transmission configuration; and transmitting, by the first wireless communication device to the second wireless communication device, an autonomous uplink communication signal based on the determined transmission parameter.

In an additional aspect of the disclosure, a method of wireless communication includes transmitting, by a first wireless communication device, an autonomous uplink transmission configuration; and receiving, by the first wireless communication device from a second wireless communication device, an autonomous uplink communication signal based on a transmission parameter indicated by the autonomous uplink communication signal, the transmission parameter selected from the autonomous uplink transmission configuration based on a link adaptation parameter.

In an additional aspect of the disclosure, an apparatus includes a transceiver configured to receive, from a second wireless communication device, an autonomous uplink transmission configuration; and transmit, to the second wireless communication device, an autonomous uplink communication signal based on a transmission parameter; and a processor configured to determine the transmission parameter in response to a link adaptation parameter based on the autonomous uplink transmission configuration.

In an additional aspect of the disclosure, an apparatus includes a transceiver configured to transmit an autonomous uplink transmission configuration; and receive, from a second wireless communication device, an autonomous uplink communication signal based on a transmission parameter indicated by the autonomous uplink communication signal, the transmission parameter selected from the autonomous uplink transmission configuration based on a link adaptation parameter.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
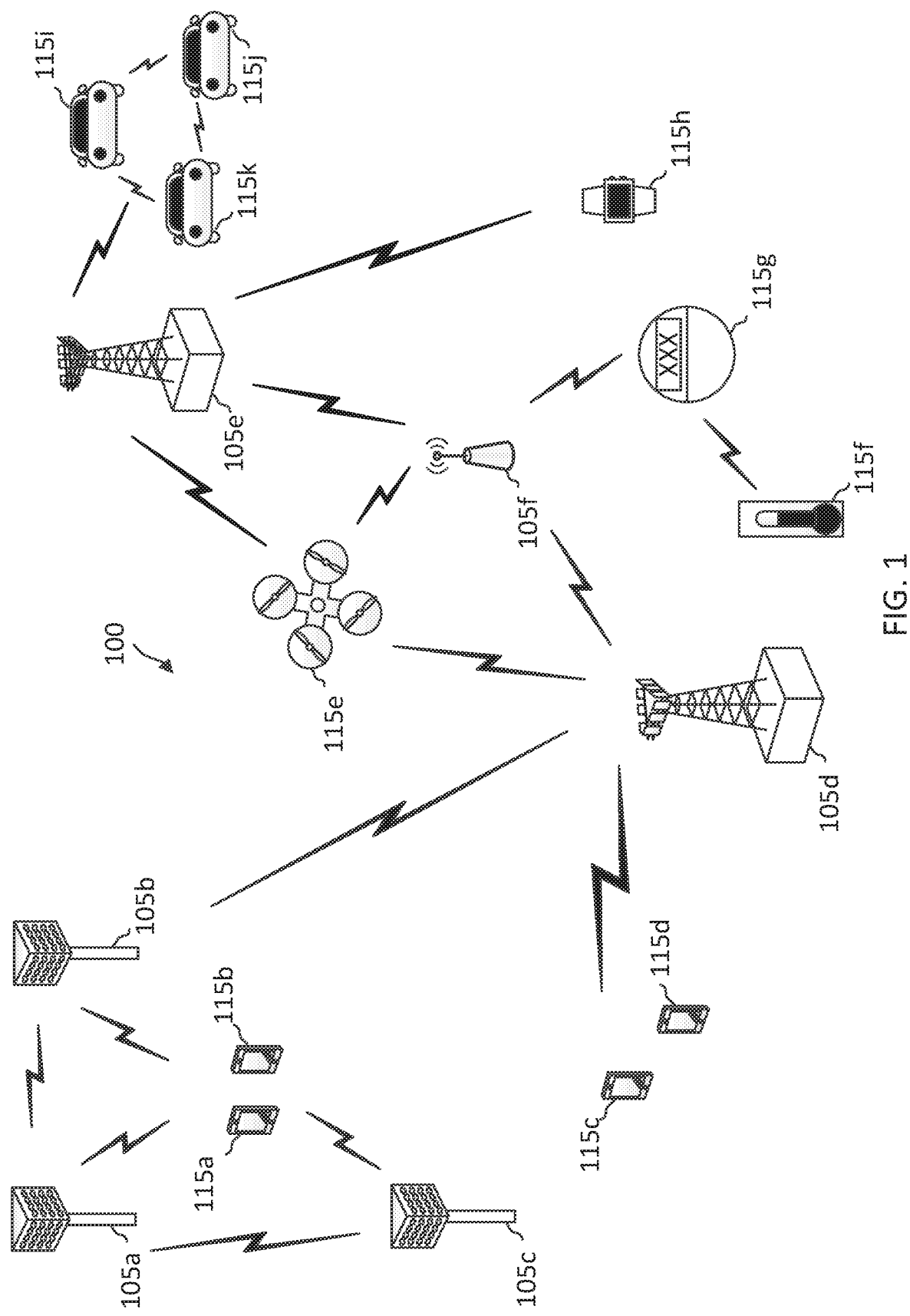
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for fast adaptive autonomous uplink (UL) communications. For example, a UE may autonomously transmit a UL signal to a BS without receiving a UL transmission schedule assigned by the BS. The BS may provide a configuration that a UE may use for autonomous UL communications. The configuration may include transmission parameters including a modulation coding scheme (MCS), a rank indicator (RI), a pre-coding matrix indication (PMI), a waveform type, and/or a resource allocation. The UE and/or the BS may dynamically adjust the transmission parameters to adapt to a radio link, traffic load, and/or UE's requirements. The BS may further provide a range of allowable parameters for an autonomous UL communication and the UE may select the transmission parameters from the range of allowable parameters.

According to some embodiments of the present disclosure, a UE may adjust a transmission parameter for an autonomous UL communication based on DL signaling information (e.g., CSI-RS, noise level, and/or interference level), channel measurements, path-loss measurements, acknowledgement/negative-acknowledgement (ACK/NACK) feedback statistics, and/or channel statues obtain determined from LBT procedures.

According to some embodiments of the present disclosure, a UE may select a subset of resources (e.g., reducing in a frequency occupancy or a time occupancy) from the allowable configuration for an autonomous UL communication signal based on a transmission queue or buffer status at the UE, and/or a power headroom parameter of the UE.

According to some embodiments of the present disclosure, a UE may transmit an autonomous UL communication signal including uplink control information (UCI) indicating an adjusted or a selected transmission parameter used for the transmission. A BS may receive and decode the autonomous UL communication signal based on the UCI. Alternatively, when the UE does not provide the UCI, a BS may apply blind detection to receive and decode an autonomous UL communication signal.

According to some embodiments of the present disclosure, a BS may perform link and/or traffic load adaptation. The BS may include an updated configuration for a subsequent autonomous UL transmission configuration in an ACK/NACK feedback for an autonomous UL communication signal or in a grant for a scheduled UL transmission.

Aspects of the present application can provide several benefits. For example, the autonomous UL communications can improve channelization in an unlicensed spectrum without having to rely on a BS gaining access to a medium to issue an UL grant, and thus may reduce delays for autonomous UL communications. The dynamic adaptation of transmission parameters to the condition or quality of a radio link, traffic load, and/or UE requirements can improve system performance and/or throughput. The initiation of the adaptation at the UEs and the BS allows for a fast adaptation in response to dynamic link and/or traffic changes, and thus can further improve system performance and/or throughput. Thus, the disclosed embodiments may benefit ultra-low latency and/or mission-critical communications. The disclosed embodiments can also be applied to a licensed spectrum to reduce autonomous UL communication delays. The disclosed embodiments are suitable for use with any wireless communication protocol.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes 01-DM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may be an NR network deployed over an unlicensed spectrum (e.g., in sub-6 GHz bands) shared by multiple network operating entities, which may operate using various wireless technologies such as WiFi, license assisted access (LAA), and MulteFire (MF). The multiple network operating entities may coordinate access to the spectrum. For example, different network operating entities may be assigned with different access priorities during time periods. Each transmitting node (e.g., the BSs 105 and the UEs 115) may perform medium sensing (e.g., listen-before-talk (LBT) or clear channel assessment (CCA)) prior to transmissions in the spectrum to avoid or minimize collisions with other nodes sharing the spectrum. After a BS 105 gains access to a transmission opportunity (TXOP) in the spectrum, the BS 105 may communicate with the UEs 115 using similar mechanisms as in a licensed spectrum described above.

In an embodiment, the network 100 may support autonomous UL communications to reduce UL transmission delays. An autonomous UL communication signal may include UL control information (UCI) and/or UL data. For autonomous UL communications, a UE 115 may autonomously transmit data to a serving BS 105 without relying on the serving BS 105 to issue a UL grant or to have medium access before issuing a UL grant. To support autonomous UL communications, a BS 105 may configure certain transmission parameters (e.g., an MCS, an RI, a PMI, a resource allocation, and/or a waveform type) that a UE 115 may use to transmit data autonomously to the BS 105. The BS 105 may indicate the autonomous transmission configuration in a RRC message and/or in activation/de-activation downlink control information (DCI). RRC messages and/or activation/de-activation downlink control information (DCI) are typically sent at a relatively slow rate, for example, at about every 40 milliseconds (ms). To improve system throughput or the performance for autonomous UL communications, the BSs 105 and/or the UEs 115 may initiate link adaptation and/or resource adaptation. Link adaptation may include dynamically adjusting an MCS, an RI, a PMI, and/or a waveform type based on the quality of a radio link. Resource adaptation may include dynamically reducing or changing an MCS, reducing the amount of resources in a frequency domain, and/or reducing the amount of resources in a time domain based on a payload size, traffic load, and/or a UE power headroom parameters. Mechanisms for performing adaptive autonomous UL communications are described in greater detail herein.

Figure 2:
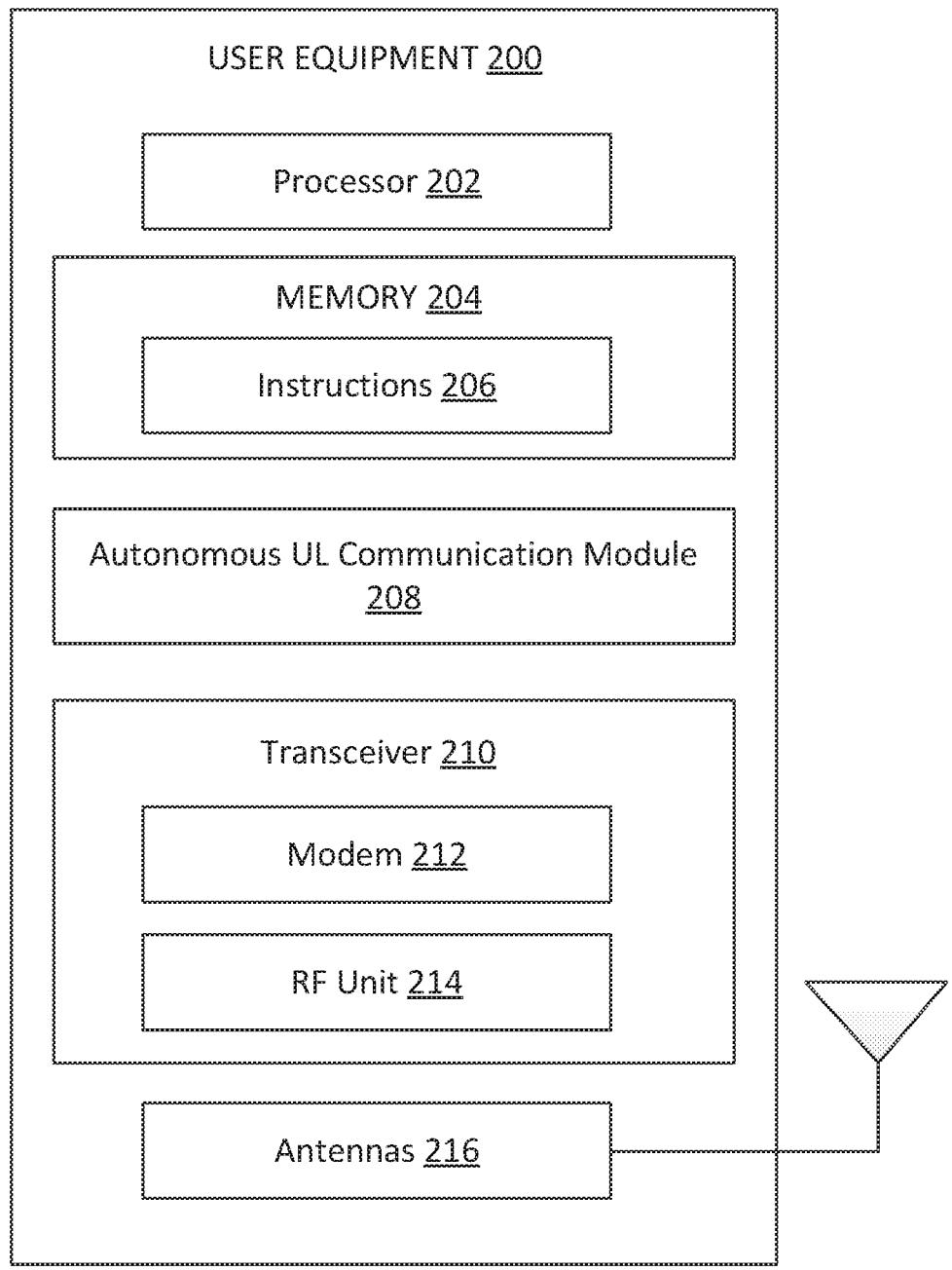
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above. As shown, the UE 200 may include a processor 202, a memory 204, an autonomous UL communication module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The autonomous UL communication module 208 may be implemented via hardware, software, or combinations thereof. For example, the autonomous UL communication module 208 may be implemented as a processor, circuit, and/or instructions 206 stored in the memory 204 and executed by the processor 202. The autonomous UL communication module 208 may be used for various aspects of the present disclosure. For example, the autonomous UL communication module 208 is configured to receive an autonomous UL transmission configuration from a BS (e.g., the BSs 105) including preconfigured and/or allowable transmission parameters (e.g., MCS, RI, PMI, waveform type, and/or resource allocation), adjust the preconfigured parameters and/or select from the allowable parameters for link adaptation and/or resource adaptation, and/or transmit UCI to the BS indicating the selected and/or adjusted transmission parameters. The autonomous UL communication module 208 can select and/or adjust the transmission parameters based DL signaling information, path-loss measurements, ACK/NACK feedback statistics, LBT results, transmission buffer statuses, and/or power headroom parameters of the UE 200, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the autonomous UL communication module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. This may include, for example, transmitting autonomous UL communication signals and/or UCI carrying transmission parameters used for the transmission of the autonomous UL communication signals according to embodiments of the present disclosure. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
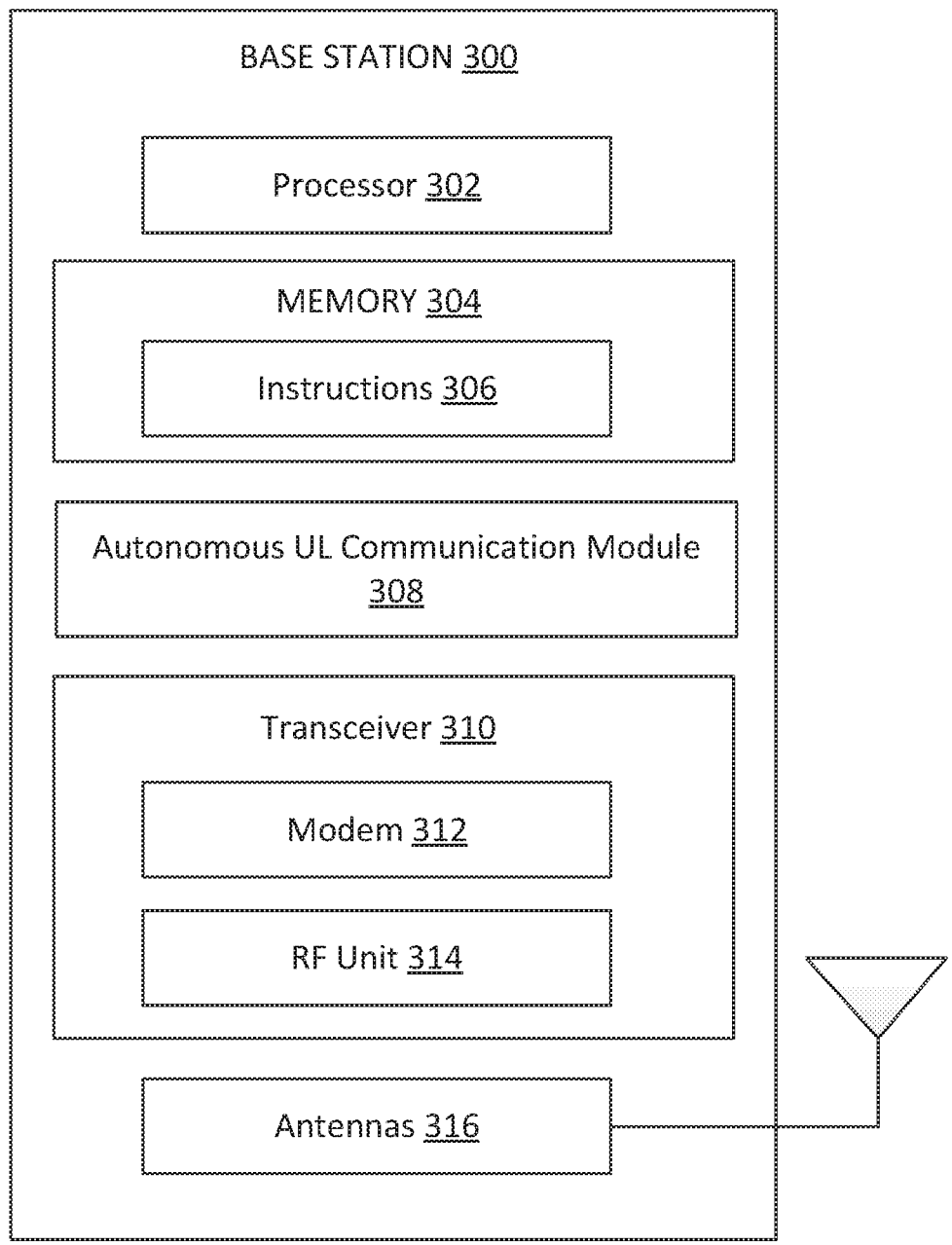
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above. A shown, the BS 300 may include a processor 302, a memory 304, an autonomous UL communication module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 3.

The autonomous UL communication module 308 may be implemented via hardware, software, or combinations thereof. For example, the autonomous UL communication module 308 may be implemented as a processor, circuit, and/or instructions 306 stored in the memory 304 and executed by the processor 302. The autonomous UL communication module 308 may be used for various aspects of the present disclosure. For example, the autonomous UL communication module 308 is configured to determine preconfigured and/or allowable autonomous UL transmission parameters (e.g., MCS, RI, PMI, waveform type, and/or resource allocation), transmit an autonomous UL transmission configuration to UEs (e.g., the UEs 115 and 200) indicating the preconfigured and/or allowable transmission parameters, perform blind detection to detect autonomous UL signals transmitted with UE-adjusted parameters, receive autonomous UL signals from the UEs based on UCI indicated by the UEs, perform link adaptation, transmit updated transmission parameters to UEs in autonomous UL feedbacks and/or scheduled UL grants, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
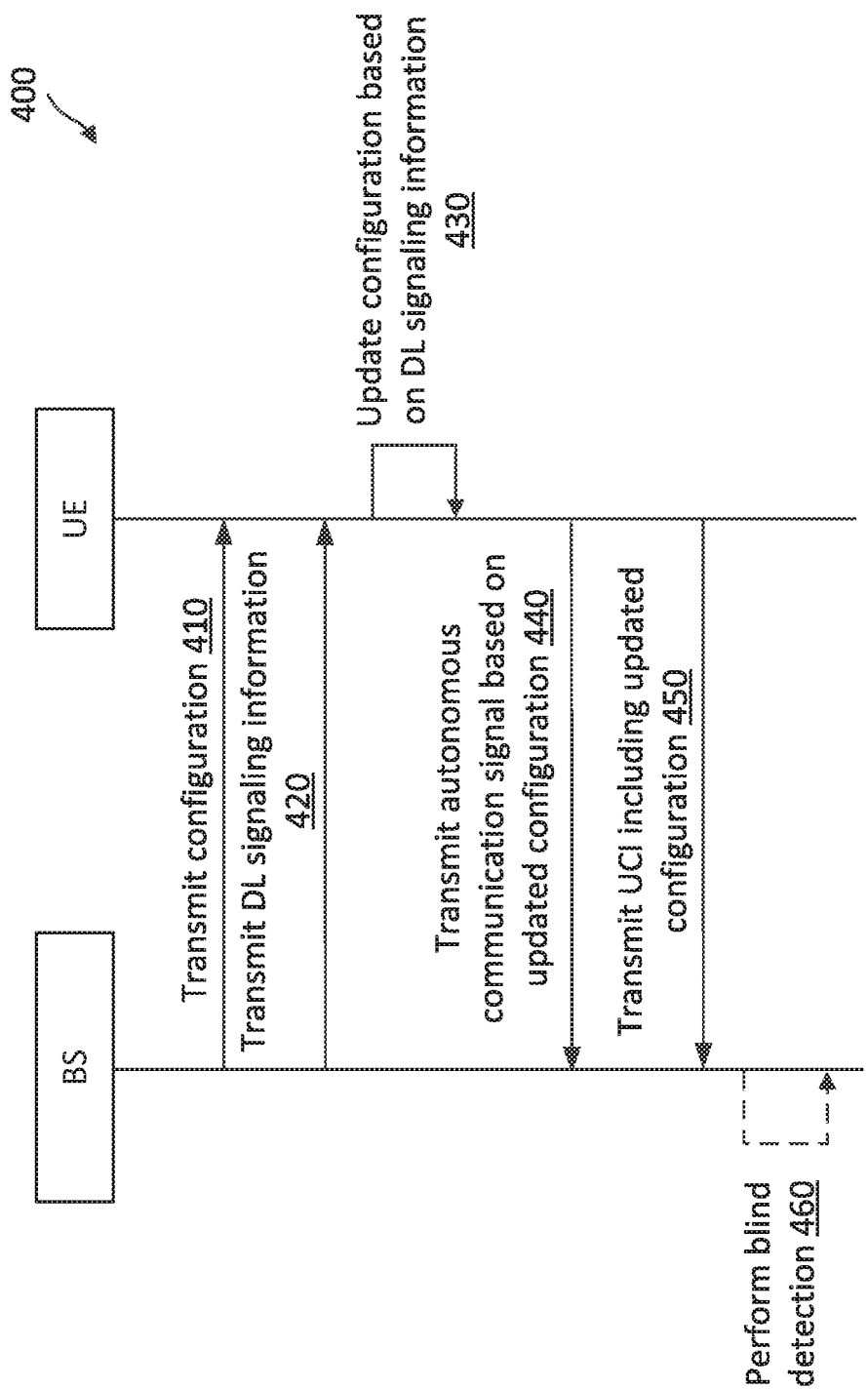
FIG. 4 illustrates a signaling diagram of a UE-initiated adaptive autonomous uplink (UL) communication method according to embodiments of the present disclosure.
Figure 5:
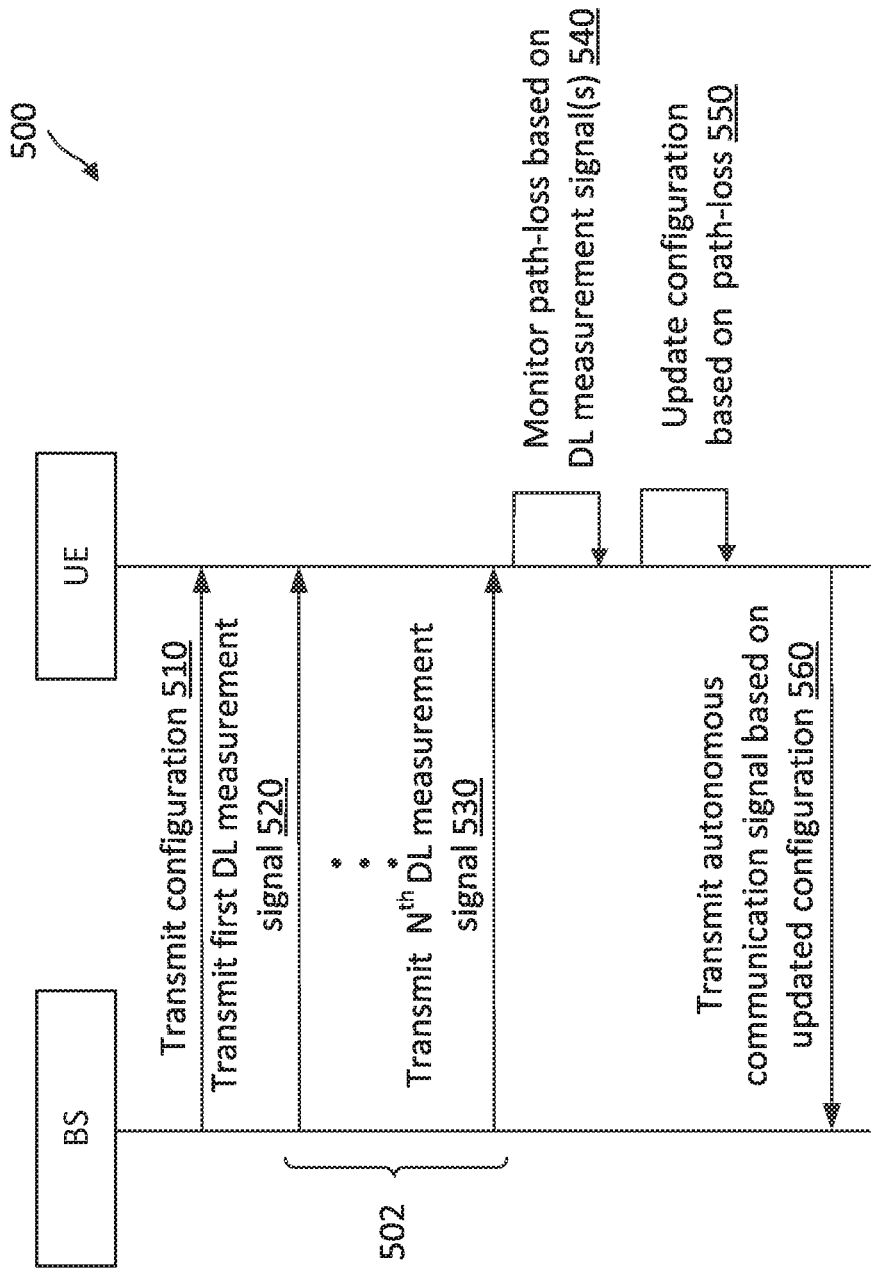
FIG. 5 illustrates a signaling diagram of a UE-initiated adaptive autonomous UL communication method according to embodiments of the present disclosure.
Figure 6:
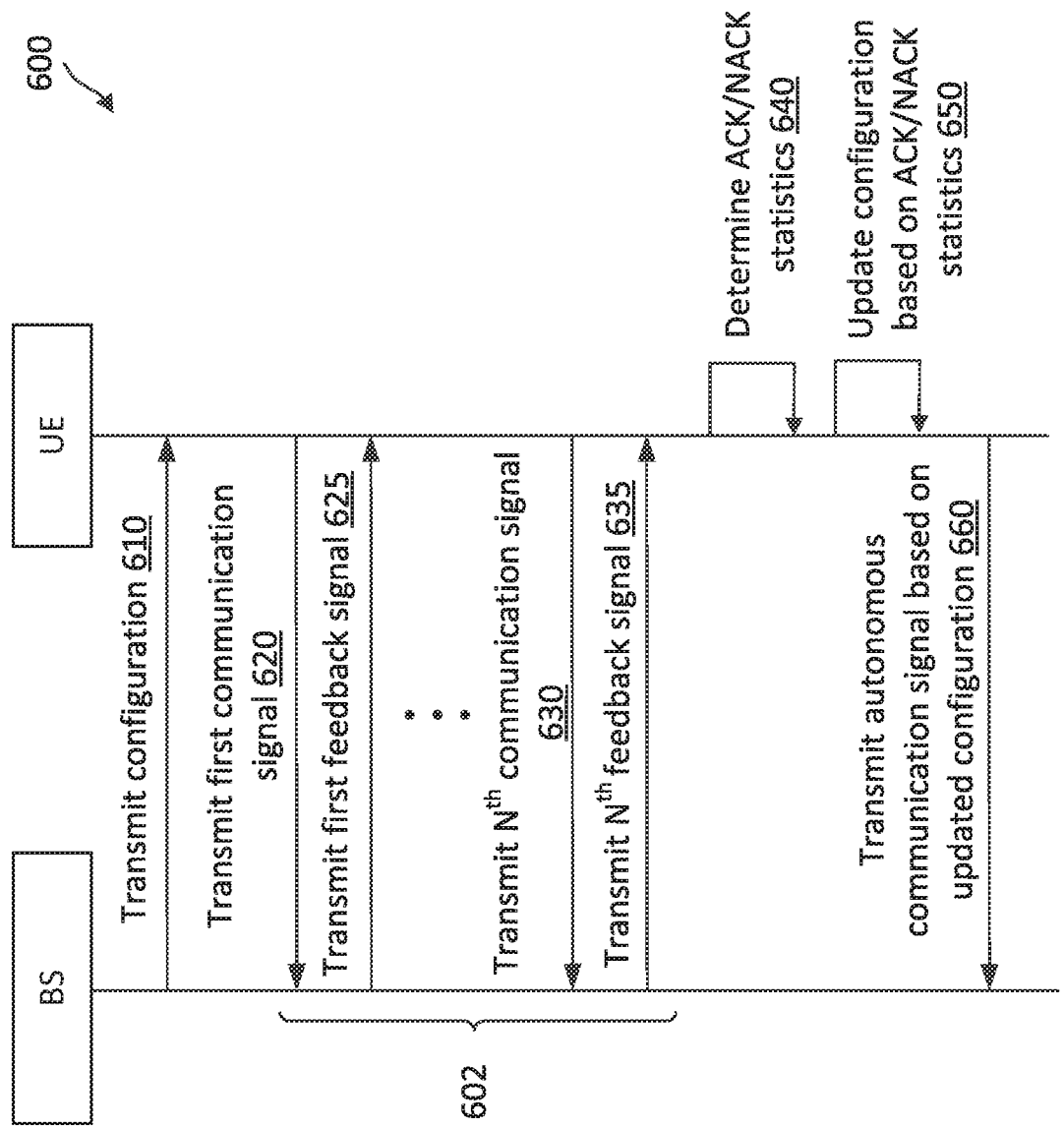
FIG. 6 illustrates a signaling diagram of a UE-initiated adaptive autonomous UL communication method according to embodiments of the present disclosure.

FIGS. 4-6 illustrate various UE-initiated link adaptation mechanisms that can be used for autonomous UL communications. FIG. 4 illustrates a signaling diagram of a UE-initiated adaptive autonomous UL communication method 400 according to embodiments of the present disclosure. The method 400 is implemented between a BS (e.g., the BSs 105 and 300) and a UE (e.g., the UEs 115 and 200) in a network (e.g., the network 100). Steps of the method 400 can be executed by computing devices (e.g., a processor, processing circuit, and/or other suitable component) of the BS and the UE. As illustrated, the method 400 includes a number of enumerated steps, but embodiments of the method 400 may include additional steps before, after, and in between the enumerated steps. In some embodiments, one or more of the enumerated steps may be omitted or performed in a different order.

At step 410, the BS transmits a configuration for autonomous UL transmissions. The configuration may include parameters such as a preconfigured MCS, a preconfigured RI, a preconfigured PMI, a preconfigured waveform type (e.g., OFDM or single carrier-frequency division multiplex (SC-FDM)), and/or a preconfigured resource allocation in time and frequency for an autonomous UL transmission.

In some embodiments, the BS may additionally include a range of allowable transmission parameters in the configuration. The configuration may indicate a range of allowable MCSs, such as quadrature phase-shift keying (QPSK) and quadrature amplitude modulation (QAM). The configuration may indicate a range of allowable transmission ranks, such as rank 1 and rank 2 (e.g., multi-user multiple-input multiple-output (MU-MIMO)). The configuration may include different allowable waveforms, such as an OFDM waveform and an SC-FDM waveform. The configuration may include different allowable resource assignments, different allowable starting symbols (e.g., symbol 0 or symbol 1, etc.), and/or different allowable ending symbols (e.g., symbol 6, symbol 12 or symbol 13, etc.).

At step 420, the BS transmits DL signaling information. The DL signaling information may include a DL measurement or reference signal, such as a channel state information-reference signal (CSI-RS). In some embodiments, the BS may additionally broadcast estimated UL channel noise and/or interference information (e.g., quantized noise/interference levels) to one or more UEs.

At step 430, the UE updates the configuration based on the received DL signaling information. For example, the UE may determine an UL channel response based on channel reciprocity using channel measurements obtained from the received DL reference signal. The UE may adjust the preconfigured transmission parameters (e.g., MCS, RI, PMI, and/or waveform types) based on the DL channel measurements. When the BS provides UL channel and/or interference information, the UE may adjust the preconfigured transmission parameters based on the channel and/or interference information. When the configuration includes allowable transmission parameters, the UE may select transmission parameters from the allowable transmission parameters based on the DL measurements and/or the noise/interference information. The UE may determine the update based on a threshold comparison, for example, when the DL channel measurement exceeds a threshold or the noise/interference level exceeds a threshold.

At step 440, the UE transmits an autonomous communication signal based on the updated configuration.

At step 450, the UE transmits UCI indicating the updated configuration (e.g., MCI, RI, PMI, and/or waveform type) used for the transmission of the autonomous communication signal. In some embodiments, the UE may transmit the UCI in a designated resource region (e.g., in a certain OFDM symbol) assigned by the BS. Subsequently, the BS may receive the UCI and may receive and/or decode the autonomous UL communication signal based on the updated configuration in the UCI.

In some embodiments, when the combinations of allowable transmission parameters are sufficiently small, the BS may perform blind detection to search for the autonomous UL communication signal (as shown by the dashed arrow at step 460). For example, the BS may determine a search space based on the various combinations based on the configuration and searches for autonomous UL communication signal in the search space. In such embodiments, the method 400 may exclude the step 450.

FIG. 5 illustrates a signaling diagram of a UE-initiated adaptive autonomous UL communication method 500 according to embodiments of the present disclosure. The method 500 is implemented between a BS (e.g., the BSs 105 and 300) and a UE (e.g., the UEs 115 and 200) in a network (e.g., the network 100). The method 500 is substantially similar to the method 400, but the UE may perform link adaptation based on a path-loss measurement instead of DL signaling information. Steps of the method 500 can be executed by computing devices (e.g., a processor, processing circuit, and/or other suitable component) of the BS and the UE. As illustrated, the method 500 includes a number of enumerated steps, but embodiments of the method 500 may include additional steps before, after, and in between the enumerated steps. In some embodiments, one or more of the enumerated steps may be omitted or performed in a different order.

At step 510, the BS transmits a configuration for autonomous UL transmissions. The configuration may include preconfigured transmission parameters and/or a range of allowable transmission parameters.

At step 520, the BS transmits a first DL measurement signal.

At step 530, the BS transmits an $N^{th}$ DL measurement signal. The BS may transmit one or more DL measurements signals over a time period 502. In some embodiments, a DL measurement signal may include a synchronization signal (e.g., SSS, PSS, PBCH, CSI-RS signals), which may be referred to as discovery reference signals (DRSs) in an unlicensed spectrum, or any suitable reference signals.

At step 540, the UE monitors changes in a path-loss between the UE and the BS over the time period 502, based on the received DL measurement signals. For example, the UE may apply an averaging function to the path-loss measurements.

At step 550, the UE updates the configuration (e.g., MCS, RI, PMI, and/or waveform type) based on the path-loss measurements, for example, when the path-loss exceeds a certain threshold. When the configuration includes an allowable range for the transmission parameters, the UE may select transmission parameters within the allowable range.

At step 560, the UE transmits an autonomous UL communication signal based on the updated configuration.

In some embodiments, the BS may additionally broadcast rise-over-thermal (RoT) information. The UE may determine a signal-to-interference-plus-noise ratio (SINR) at the BS's receiver based on the RoT information and may update the configuration further based on the SINR. For example, the UE may increase the MCS order or reduce the MCS order based on the RoT information and/or the SINR.

Similar to the method 400, the UE may additionally transmit UCI to indicate the updated configuration or the BS may perform blind detection to search for the autonomous UL communication signal.

In some embodiments, the UE may apply frequency selective PMI or pre-coder cycling over resource block groups (RBGs) for the configuration update in the methods 400 and/or 500 when the autonomous UL communication signal has an OFDM waveform. Alternatively, the UE may select a single rank 1 pre-coder for the entire transmission bandwidth when the autonomous UL communication signal has an SC-FDM waveform.

FIG. 6 illustrates a signaling diagram of a UE-initiated adaptive autonomous UL communication method 600 according to embodiments of the present disclosure. The method 600 is implemented between a BS (e.g., the BSs 105 and 300) and a UE (e.g., the UEs 115 and 200) in a network (e.g., the network 100). The method 600 is substantially similar to the methods 400 and 500, but the UE may perform link adaptation based on ACK/NACK feedback statistics. Steps of the method 600 can be executed by computing devices (e.g., a processor, processing circuit, and/or other suitable component) of the BS and the UE. As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 610, the BS transmits a configuration for autonomous UL transmissions. The configuration may include preconfigured transmission parameters and/or a range of allowable transmission parameters.

At step 620, the UE transmits a first UL communication signal to the BS.

At step 625, the BS transmits a first feedback signal for the first UL communication signal. The first feedback signal may indicate an ACK when the reception of the first UL communication signal is successful. Alternatively, the first feedback signal may indicate a NACK when the reception of the first UL communication signal is unsuccessful (e.g., including errors).

At step 630, the UE transmits an $N^{th}$ UL communication signal to the BS.

At step 635, in response, the BS transmits an $N^{th}$ feedback signal indicating a reception status of the $N^{th}$ UL communication signal. The BS and the UE may exchange one or more UL communication signals and corresponding feedback signals over a time period 602.

In some embodiments, the BS may transmit scheduling grants for the transmissions of the UL communication signals and the feedback signals may be implicitly included in retransmission grants via a new data indicator. In some embodiments, the UE transmits the UL communication signals autonomously to the BS and the feedback signals are received from an autonomous uplink feedback channel. Note that the feedback may not be sent after every autonomous UL transmission. A single feedback message may be sent containing ACK/NACK feedback information for multiple autonomous UL transmissions. Furthermore, note that not receiving feedback for an autonomous UL transmission within a pre-configured period of time after the autonomous UL transmission may be considered by UE as receiving a NACK.

In some embodiments, a UL communication signal may include one or more transport blocks (TBs) and a feedback signal may indicate an ACK or a NACK for each TB. In some embodiments, a UL communication signal may include one or more TBs each including one or more code-blocks (CBs) and a feedback signal may indicate an ACK or a NACK for each code-block group (CBG) in a TB.

At step 640, the UE determines ACK/NACK statistics. For example, the UE may determine a metric based on the number of ACKs and/or the number of NACKs in the feedback signals received over the time period 602.

At step 650, the UE updates the configuration (e.g., an MCS, RI, PMI, and/or waveform types) based on the ACK/NACK metric. For example, the UE may maintain a table tracking the number of ACKs and/or NACKs received. The UE may increase the MCS (e.g., from QPSK to 16-QAM) and/or RI order (e.g., from rank 1 to rank 2) when the number of ACKs increases. Alternatively, the UE may decrease the MCS and/or RI order when the number of NACKs increases. In some embodiments, the UE may adjust the transmission parameters based on a weighted sum of the number of ACKs, a weighted sum of the number of NACKs, and/or a ratio of the number of ACKs to the number of NACKs. In some embodiments, the BS may include a step sizes and/or a maximum range allowable for the adjustments in the configuration. In some embodiments, the BS may configure different step sizes for stepping up or stepping down the transmission parameters.

At step 660, the UE transmits an autonomous UL communication signal based on the updated configuration. Similar to the method 400, the UE may additionally transmit UCI to indicate the updated configuration (e.g., a reduced time length, a selected frequency interlace, and/or a reduced MCS) or the BS may perform blind detection to search for the autonomous UL communication signal.

Figure 7:
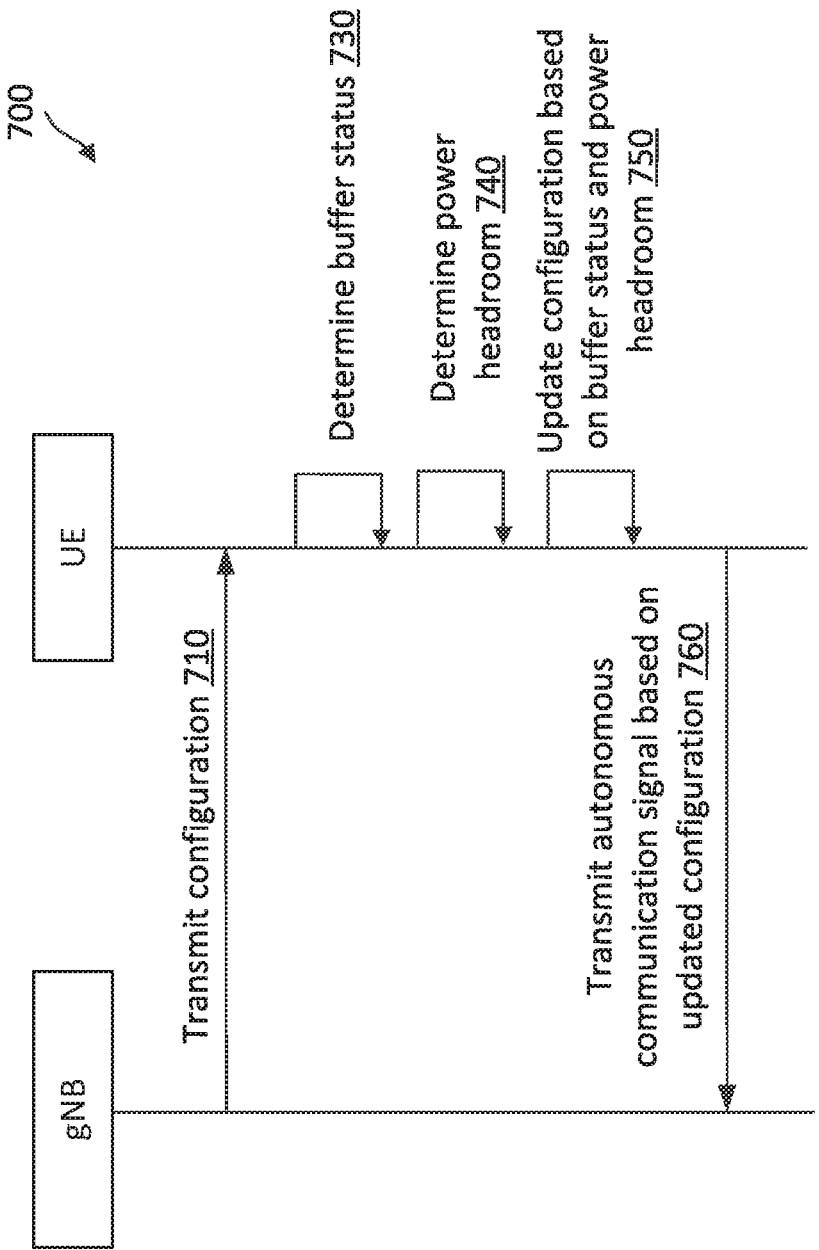
FIG. 7 illustrates a signaling diagram of a UE-initiated adaptive autonomous UL communication method according to embodiments of the present disclosure.
Figure 8:
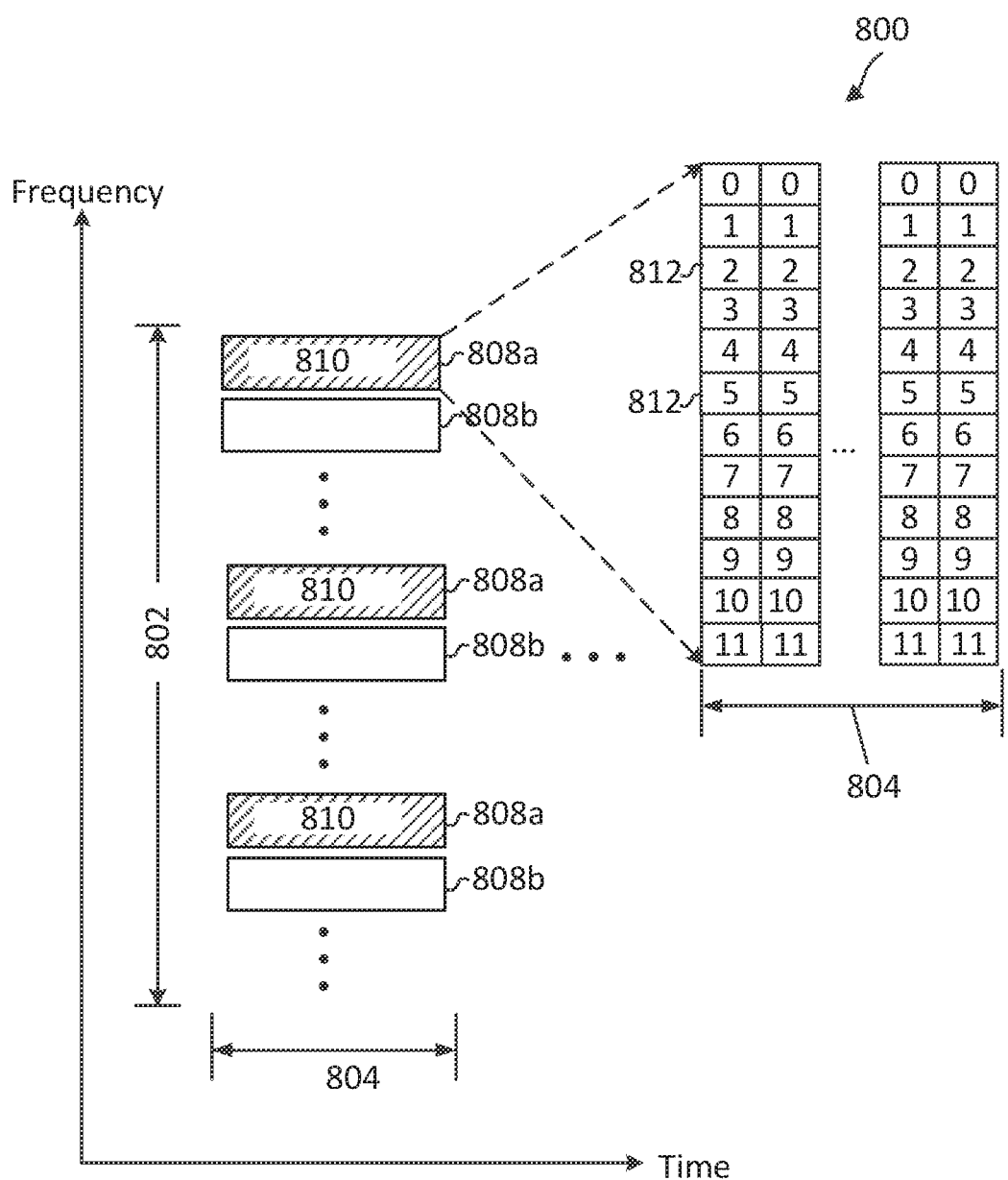
FIG. 8 illustrates a resource adaptation scheme for autonomous UL communications according to embodiments of the present disclosure.
Figure 9:
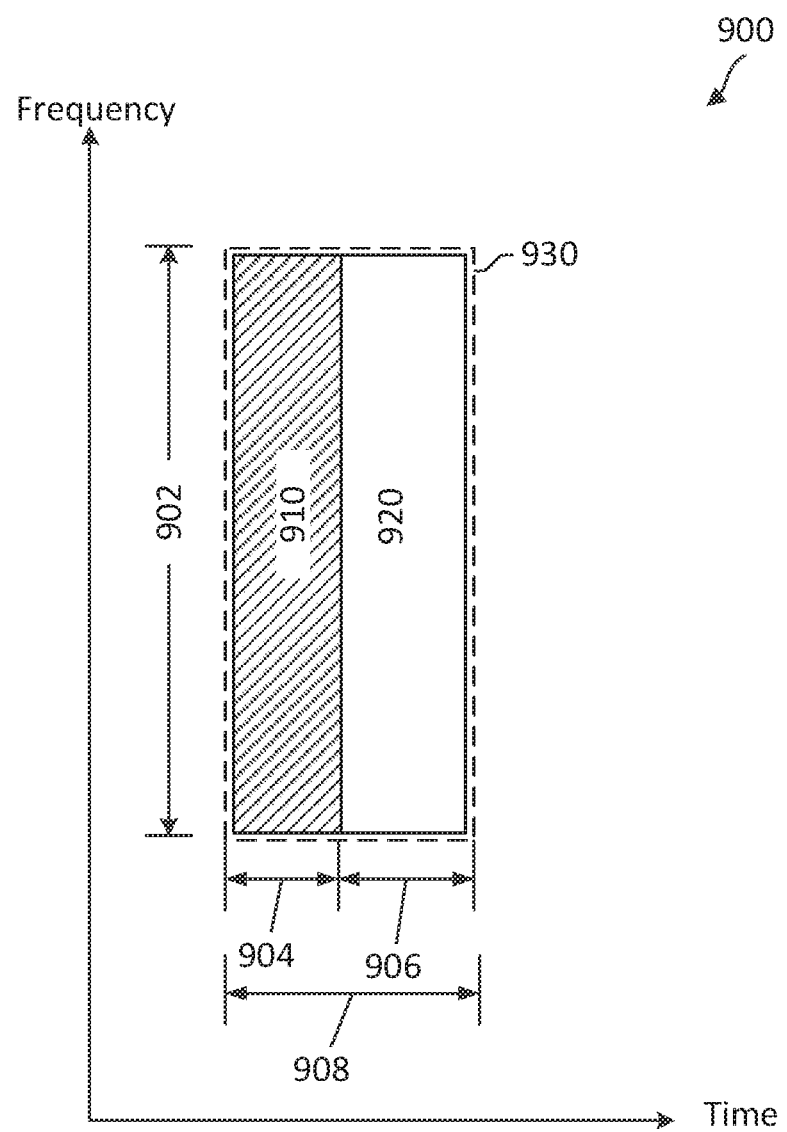
FIG. 9 illustrates a resource adaptation scheme for autonomous UL communications according to embodiments of the present disclosure.

FIGS. 7-9 illustrate various UE-initiated resource adaptation mechanisms that can be used for autonomous UL communications. FIG. 7 illustrates a signaling diagram of a UE-initiated adaptive autonomous UL communication method 700 according to embodiments of the present disclosure. The method 700 is implemented between a BS (e.g., the BSs 105 and 300) and a UE (e.g., the UEs 115 and 200) in a network (e.g., the network 100). Steps of the method 700 can be executed by computing devices (e.g., a processor, processing circuit, and/or other suitable component) of the BS and the UE. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the BS transmits a configuration for autonomous UL transmissions. The configuration may include preconfigured transmission parameters and/or a range of allowable transmission parameters.

At step 720, the UE determines a buffer status or a transmission queue status, for example, indicating the number of data bytes (e.g., payload size) ready for UL transmission.

At step 730, the UE determines a power headroom of the UE.

At step 740, the UE update the configuration based on the buffer status and/or the power headroom.

In an embodiment, the configuration may indicate a resource allocation and a MCS. The resource allocation and the MCS determine a TB size for a transmission. When the payload size available in the UE buffer for the UL transmission is less than the TB size corresponding to the preconfiguration for the autonomous transmission, the UE may select a lower order MCS than the indicated MCS to improve reliability and/or reduce transmission power (e.g., to reduce interference) instead of applying zero-padding to meet the TB size. Alternatively, the UE may use the indicated MCS and complete the UL transmission within a shorter time duration, as described in greater detail herein.

In an embodiment, the configuration may indicate a resource allocation including two frequency interlaces. A frequency interlace may include frequency subcarriers or tones spaced apart over a channel bandwidth. The UE may determine that the UE may not have a sufficient power headroom to transmit in two frequency interlaces, and thus may select one frequency interlace for autonomous UL communication, as described in greater detail herein. In some embodiments, the UE may determine to use one frequency interlace when the payload size is small.

At step 760, the UE transmits an autonomous UL communication signal based on the updated configuration. Similar to the method 400, the UE may additionally transmit UCI to indicate the updated configuration or the BS may perform blind detection to search for the autonomous UL communication signal. In an embodiment, the BS may perform the blind detection based on whether a demodulation reference signal (DMRS) is detected in a particular frequency band or a particular time duration within the resource allocation. Accordingly, in some instances, the updated configuration may be determined at the BS by a combination of detecting the DMRS (e.g. time frequency resources, DMRS sequence parameters, and/or DMRS port parameters), information contained in UCI, and through blind detection/decoding.

FIG. 8 illustrates a resource adaptation scheme 800 for autonomous UL communications according to embodiments of the present disclosure. The scheme 800 may be employed by a UE (e.g., the UEs 115 and 200) and a BS (e.g., the BSs 105 and 300) in conjunction with the method 700. In FIG. 8, the x-axis represents time in some constant units and the y-axis represents frequency in some constant units. The scheme 900 illustrates resource adaptation in a frequency domain. FIG. 8 illustrates two frequency interlaces 808a and 808b in a frequency spectrum 802 over a time period 804 for purposes of simplicity of discussion, though it will be recognized that embodiments of the present disclosure may scale to include any suitable number frequency interlaces 808 (e.g., about 3, 4, 5 or more). The frequency spectrum 802 may be a licensed spectrum or an unlicensed spectrum. Each frequency interlace 808a or 808b may include groups of tones 812 spaced apart over the frequency spectrum 802. Each group of tones 812 may include about twelve tones 812 as shown or any suitable number tones 812 (e.g., between about 1 to about 12). The time period 804 may include any suitable number of symbols (e.g., about 7 or about 14).

The scheme 800 illustrates resource adaptation in a frequency domain. As an example, a BS may assign two frequency interlaces 808a and 808b for autonomous UL communications. A UE may select one frequency interlace 808a instead of using both frequency interlaces 808a and 808b, for example, based on a buffer status and/or a power headroom as described in the method 700 with respect to FIG. 7 and transmit an autonomous UL communication signal 810 using the frequency interlace 808a as shown by the patterned boxes.

FIG. 9 illustrates a resource adaptation scheme 900 for autonomous UL communications according to embodiments of the present disclosure. The scheme 900 may be employed by a UE (e.g., the UEs 115 and 200) and a BS (e.g., the BSs 105 and 300) in conjunction with the method 700. In FIG. 9, the x-axis represents time in some constant units and the y-axis represents frequency in some constant units. The scheme 900 illustrates resource adaptation in a time domain. As an example, a BS may allocate resources 930 in a frequency spectrum 902 over a time period 908. The frequency spectrum 902 may be a licensed spectrum or an unlicensed spectrum. The time period 908 may include any suitable number of OFDM symbols (e.g., about 14 symbols). A UE may determine to transmit an autonomous UL communication signal 910 during a time period 904 (e.g., about 7 symbols) within the time period 908, for example, based on a buffer status or a payload size. The remaining time period 906 can be used by another UE. For example, the other UE may listen to the channel (e.g., performing a LBT) and determine that the channel is available after the time period 904. Thus, the other UE may transmit an autonomous UL communication signal 920 during the remaining time period 906.

Figure 10:
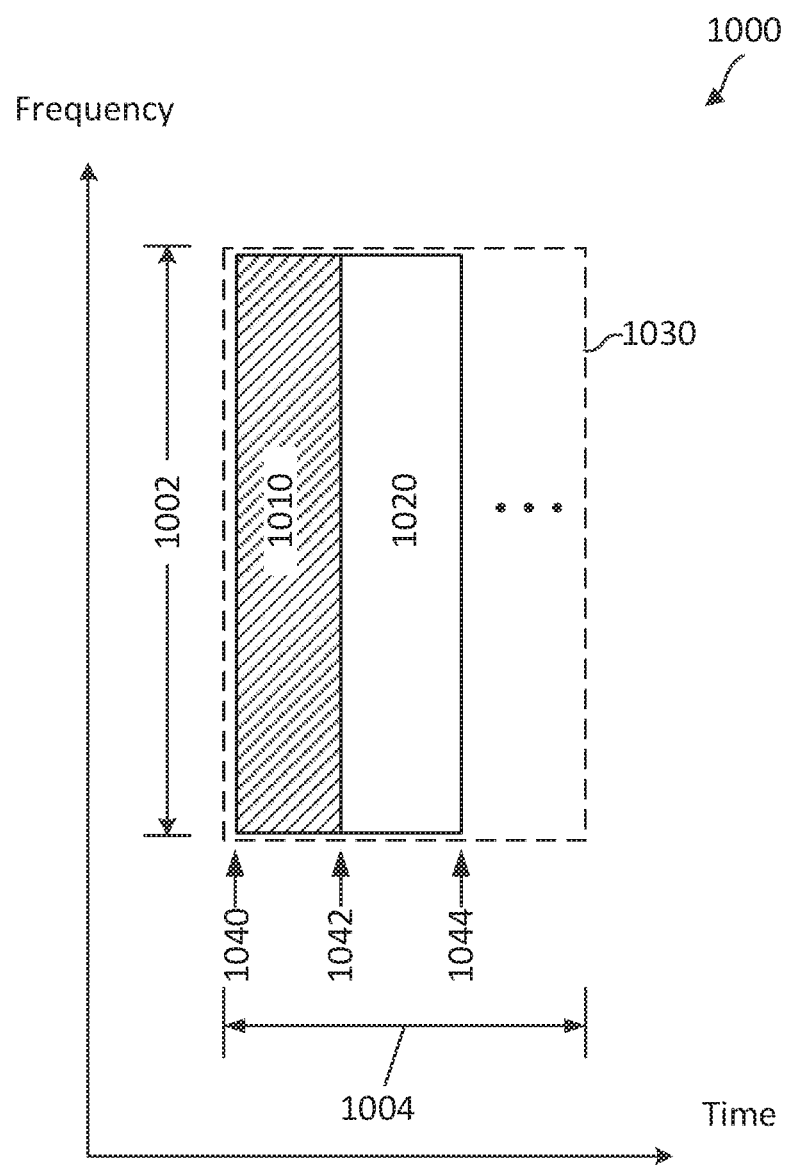
FIG. 10 illustrates a listen-before-talk (LBT)-based autonomous UL communication scheme according to embodiments of the present disclosure.

FIG. 10 illustrates an LBT-based autonomous UL communication scheme 1000 according to embodiments of the present disclosure. The scheme 1000 may be employed by a UE (e.g., the UEs 115 and 200) and a BS (e.g., the BSs 105 and 300) in conjunction with the method 700 and/or the schemes 800 and 900. In FIG. 10, the x-axis represents time in some constant units and the y-axis represents frequency in some constant units.

In the scheme 1000, a BS may allocate resources 1030 in a frequency spectrum 1002 over a time period 1004. The frequency spectrum 1002 may be a licensed spectrum or an unlicensed spectrum. The time period 1004 may include any suitable number of OFDM symbols (e.g., between about 1 to about 14 symbols). The BS may configure a plurality of allowable transmission starting symbols. For example, the BS may indicate that an autonomous UL transmission may start at a symbol 1040 (e.g., symbol 0) and end at a symbol 1042 (e.g., symbol 1) or may start at the symbol 1042 and end at a symbol 1044 (e.g., symbol 2). A first UE may determine to transmit an autonomous UL communication signal 1010 beginning at the symbol 1040. A second UE may listen to the channel. The second UE may perform LBT and detect the transmission of the autonomous UL communication signal 1010 in the symbol 1040. The second UE may continue with the LBT until the next starting symbol 1042 for a potential transmission. For example, the second UE may determine that the channel is clear at the symbol 1042 and may transmit an autonomous UL communication signal 1020 beginning at the symbol 1042.

In some embodiments, the BS may configure resources in the symbol 1042 (e.g., symbol 1) for UCI transmissions. For example, the first UE and/or the second UE may transmit UCI in the symbol 1042 to indicate the starting transmission symbol selected by the corresponding UEs. Accordingly, the inclusion of the starting transmission symbol indication in the UCI can ease decoding at the BS. For example, the BS can decode the UCI without knowing the starting transmission symbol of a UE's UL communication signal 1020 as the location of the UCI is independent of the starting transmission symbol of the UL communication signal 1020. After decoding the UCI, the BS obtains the starting transmission symbol from the UCI and subsequently decodes the UE's UL communication signal 1020.

A UE may employ any suitable combinations of the methods 400, 500, 600, 700 and the schemes 800, 900, and 1000 for link adaptation and/or resource adaptation in autonomous UL communications. In an embodiment, a UE may indicate a selected RI via UCI or a DMRS sequence. For example, a BS may perform blind detection on DMRS ports for different rank orders. In an embodiment, a UE may indicate a selected waveform type via UCI or a DMRS sequence. For example, when the selected waveform type is discrete Fourier transform-spread-OFDM (DFT-S-OFDM), the DMRS sequence may be based on a Zadoff-Chu (ZC) sequence or a computer generated sequence. Alternatively, when the selected waveform type is OFDM, the DMRS sequence may be based on a pseudo noise (PN) sequence.

Figure 11:
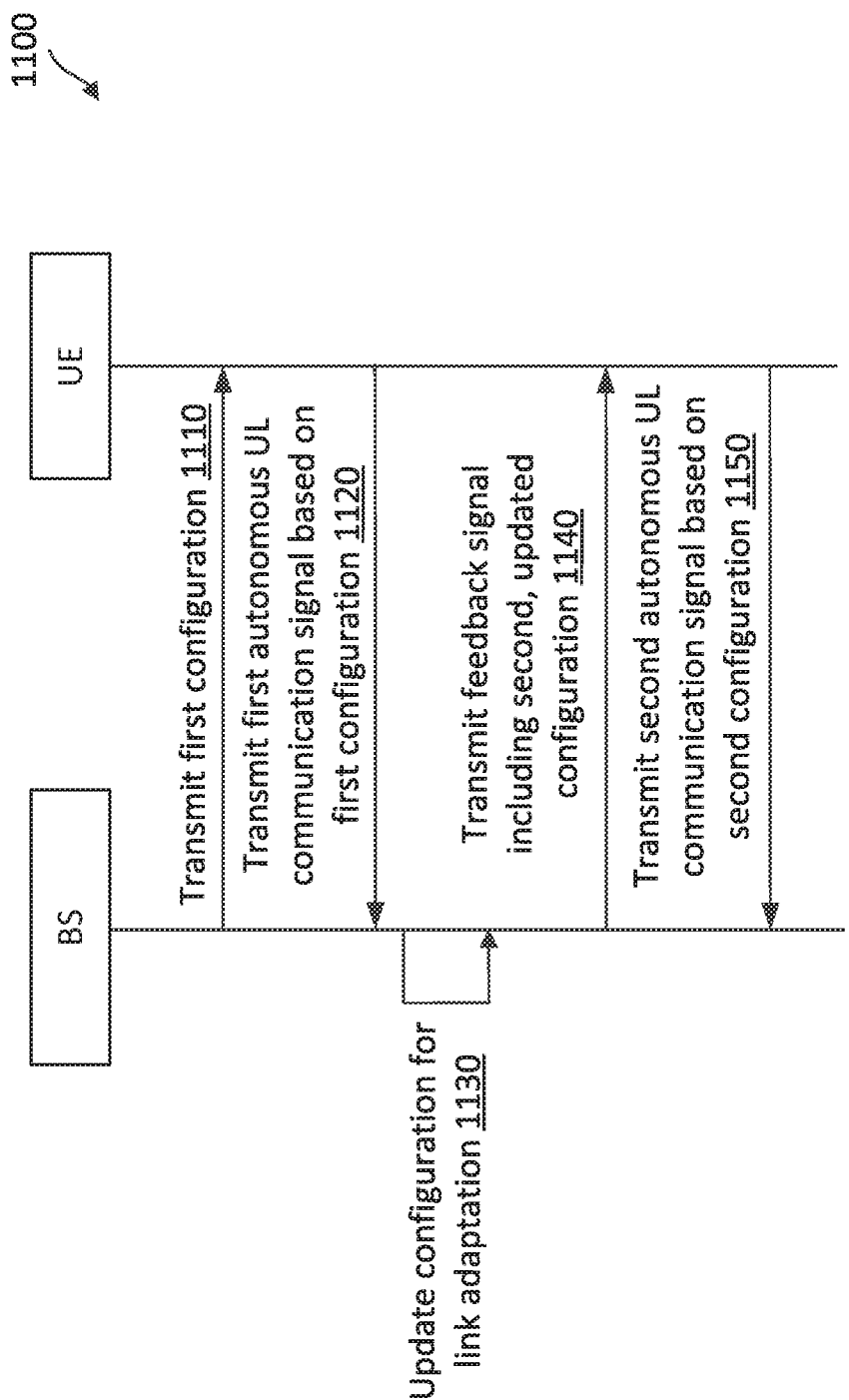
FIG. 11 illustrates a signaling diagram of a BS-initiated adaptive autonomous UL communication method according to embodiments of the present disclosure.
Figure 12:
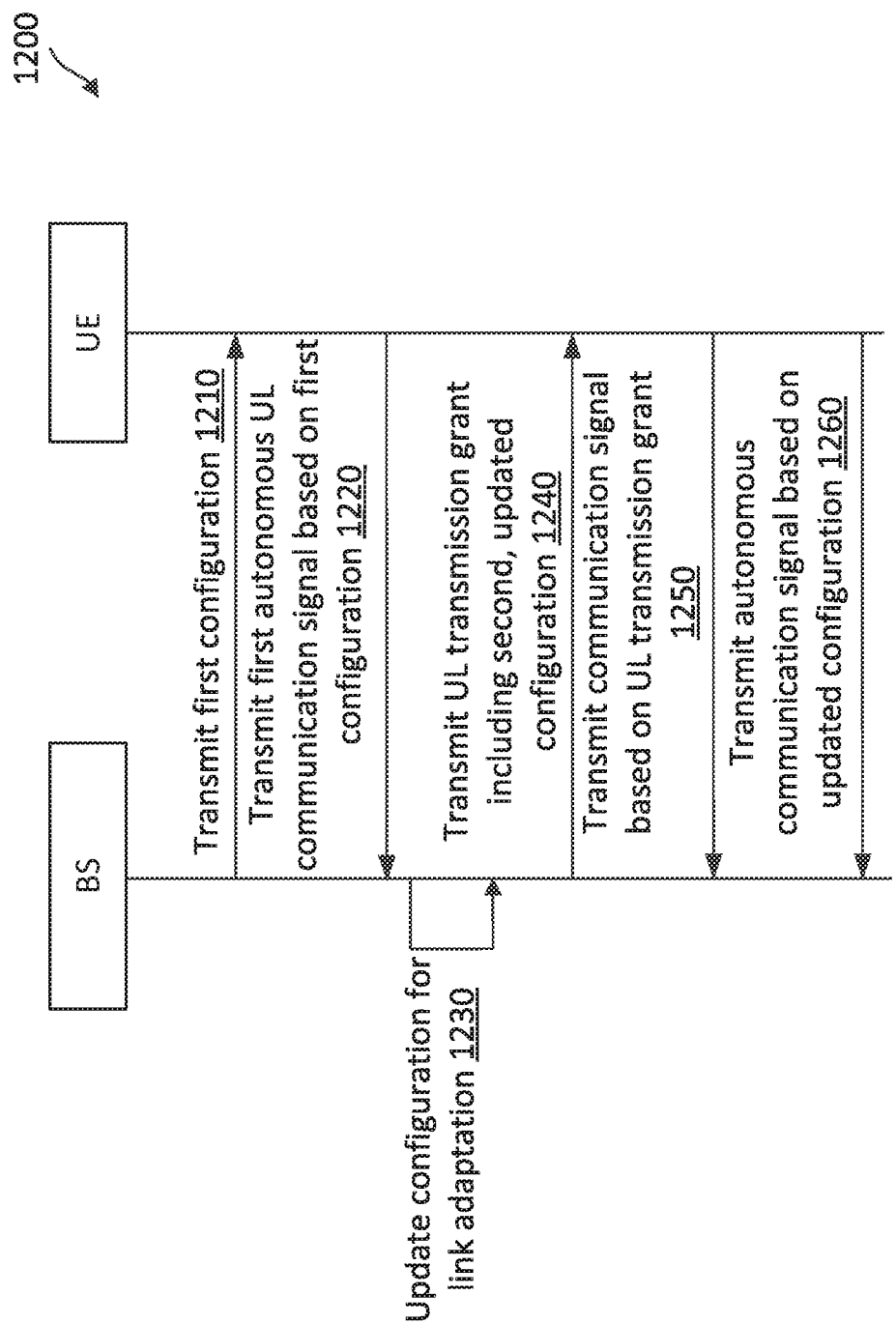
FIG. 12 illustrates a signaling diagram of a BS-initiated adaptive autonomous UL communication method according to embodiments of the present disclosure.

FIGS. 11-12 illustrate various BS-initiated link adaptation mechanisms that can be used for autonomous UL communications. FIG. 11 illustrates a signaling diagram of a BS-initiated adaptive autonomous UL communication method 1100 according to embodiments of the present disclosure. The method 1100 is implemented between a BS (e.g., the BSs 105 and 300) and a UE (e.g., the UEs 115 and 200) in a network (e.g., the network 100). Steps of the method 1100 can be executed by computing devices (e.g., a processor, processing circuit, and/or other suitable component) of the BS and the UE. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the BS transmits a first configuration for autonomous UL transmissions. The first configuration may include preconfigured transmission parameters, such as an MCS, an RI, a PMI, a waveform type, a resource allocation, and/or an offset value indicating a resource location for a UCI transmission.

At step 1120, the UE transmits a first autonomous UL communication signal based on the first configuration.

At step 1130, the BS dynamically updates the first configuration to a second configuration for link adaptation, for example, in response to a change in a channel parameter or a traffic load.

At step 1140, the BS transmits a feedback signal or a retransmission grant for the first autonomous UL communication signal including an ACK or a NACK. In addition, the BS includes the second configuration in the feedback signal for a subsequent autonomous UL communication. In the context of LTE and NR, scheduling grants and/or transmission grants are carried in DCI. Accordingly, in some instances, the BS may include the ACK/NACK feedback for the first autonomous UL communication signal and the updated configuration in a DCI.

At step 1150, the UE transmits a second autonomous UL communication signal based on the second configuration in the feedback signal received from the BS.

In some embodiments, the BS may further include an SRS request or a UL beam update request in the feedback signal to request the UE to send one or more SRSs for UL beam update, respectively.

In some embodiments, the UE may fail to receive the feedback signal, and thus may transmit the second autonomous UL communication signal based on the first configuration instead of the second configuration. To avoid a loss of synchronization between the BS and the UE, the UE may transmit UCI echoing the configuration used for the autonomous UL transmission.

FIG. 12 illustrates a signaling diagram of a BS-initiated adaptive autonomous UL communication method according to embodiments of the present disclosure. The method 1200 is implemented between a BS (e.g., the BSs 105 and 300) and a UE (e.g., the UEs 115 and 200) in a network (e.g., the network 100). Steps of the method 1200 can be executed by computing devices (e.g., a processor, processing circuit, and/or other suitable component) of the BS and the UE. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the BS transmits a first configuration for autonomous UL transmissions. The first configuration may include preconfigured transmission parameters, such as an MCS, an RI, a PMI, a waveform type, a resource allocation, and/or an offset value indicating a resource location for a UCI transmission.

At step 1220, the UE transmits a first autonomous UL communication signal based on the first configuration.

At step 1230, the BS dynamically updates the first configuration to a second configuration for link adaptation, for example, in response to a change in a channel parameter or a traffic load.

At step 1240, the BS transmits a UL transmission grant for the UE. The UL transmission grant includes the second, updated configuration.

At step 1250, the UE transmits a scheduled UL communication signal to the BS based on the UL transmission grant.

At step 1260, the UE transmits a second autonomous UL communication signal to the BS based on the second configuration. In an embodiment, the BS may receive the second autonomous UL communication signal based on the second, updated configuration when the scheduled UL communication signal is received. Otherwise, the BS may receive the second autonomous UL communication signal based on the first configuration prior to the update.

A BS may employ a combination of the methods 1100 and 1200 for link adaptation in autonomous UL communications. The BS may indicate the second, updated configuration by including an absolute number (e.g., a value of 1 representing QAM) or a difference value (e.g., a value of +1 representing a next higher MCS-order such as 16QAM or a value of −1 representing a next lower MCS-order such as QPSK). The BS may indicate whether the updated configuration is for a single use or for use over a particular duration.

Figure 13:
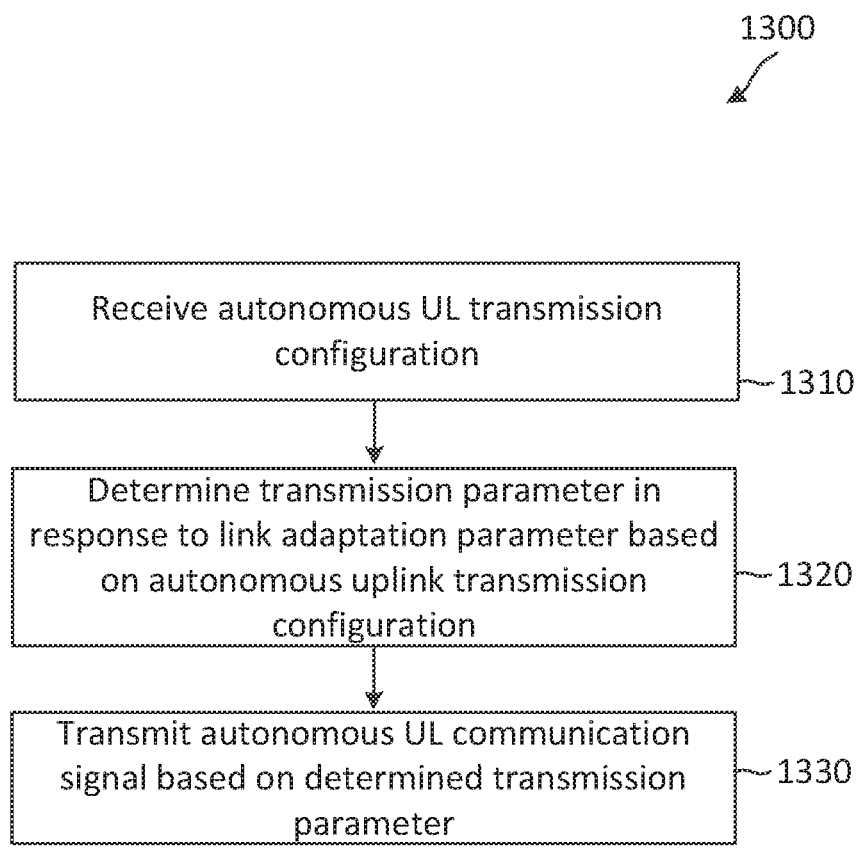
FIG. 13 is a flow diagram of a UE-initiated adaptive autonomous UL communication method according to embodiments of the present disclosure.

FIG. 13 is a flow diagram of a UE-initiated adaptive autonomous UL communication method 1300 according to embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the UEs 115 and 200, in a network, such as the network 100, may utilize one or more components, such as the processor 202, the memory 204, the autonomous UL communication module 208, the transceiver 210, and the one or more antennas 216, to execute the steps of method 1300. The method 1300 may employ similar mechanisms as in the methods 400, 500, 600, and 700 and the schemes 800, 900, and 1000 with respect to FIGS. 4, 5, 6, 7, 8, 9, and 10, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes receiving, by a first wireless communication device (e.g., the UEs 115 and 200) from a second wireless communication device (e.g., the BSs 105 and 300), an autonomous UL transmission configuration. The configuration may include one or more MCSs, one or more RIs, one or more PMIs, one or more waveform types (e.g., an OFDM waveform or a SC-FDM waveform), one or more resource allocations (e.g., the frequency interlaces 808 and the resources 930 and 1030), one or more transmission starting symbols (e.g., the symbols 1040 and 1042), and/or one or more ending symbols (e.g., the symbols 1042 and 1044).

At step 1320, the method 1300 includes determining, by the first wireless communication device, a transmission parameter in response to a link adaptation parameter based on the autonomous UL transmission configuration. The link adaptation parameter may be associated with DL signaling, a channel path-loss, an ACK/NACK feedback metric, a resource metric, and/or a transmission power metric.

In an embodiment, the transmission parameter may include an MCS, an RI, a PMI, a waveform type, or a resource parameter. The autonomous UL communication configuration may include allowable ranges for transmission parameters and the first wireless communication device may select the transmission parameter from the allowable ranges.

In an embodiment, the first wireless communication device may receive a channel parameter associated with the link adaptation parameter from the second wireless communication device (e.g., via DL signaling) and determine the transmission parameter based on the received channel parameter as shown in the method 400. The channel parameter may include a CSI-RS. The first wireless communication device may determine an UL channel response based on the received CSI-RS. The channel parameter may additionally or alternatively include a noise parameter and/or an interference parameter associated with an UL channel measured by the second wireless communication device.

In an embodiment, the first wireless communication device may receive one or more DL measurement signals (e.g., DRSs), determine a path-loss based from the received one or more DL measurement signals, and determine the transmission parameter based on the path-loss as shown in the method 500.

In an embodiment, the first wireless communication device may transmit one or more UL communication signals to the second wireless communication device. The second wireless communication device may transmit one or more feedbacks indicating ACKs and/or NACK for the communication signals. The first wireless communication device may determine ACK/NACK statistical information based on the feedbacks and determine the transmission parameter based on the feedbacks as shown in the method 600.

In an embodiment, the first wireless communication device may determine the transmission parameter based on at least one a resource metric (e.g., a transmission buffer status of the first wireless communication device) or a transmission power metric (e.g., a power headroom parameter of the first wireless communication device) as shown in the method 700 and/or the schemes 800 and/or 900. For example, the first wireless communication device may reduce an MCS order, frequency resources, and/or time resources based on the buffer status and/or the power headroom parameter.

In an embodiment, the first wireless communication device may perform an LBT in a spectrum (e.g., the spectrum 802, 902, and 1002) shared by multiple network operating entities and determine the transmission parameter based on a result of the LBT as shown in the schemes 900 and 1000.

At step 1330, the method 1300 includes transmitting, by the first wireless communication device to the second wireless communication device, an autonomous UL communication signal (e.g., the communication signals 810, 910, 920, 1010, and 1020) based on the determined transmission parameter. In some embodiments, the first wireless communication device may transmit UCI indicating the transmission parameter to facilitate the receiving and decoding of the autonomous UL communication signal at the second wireless communication device.

Figure 14:
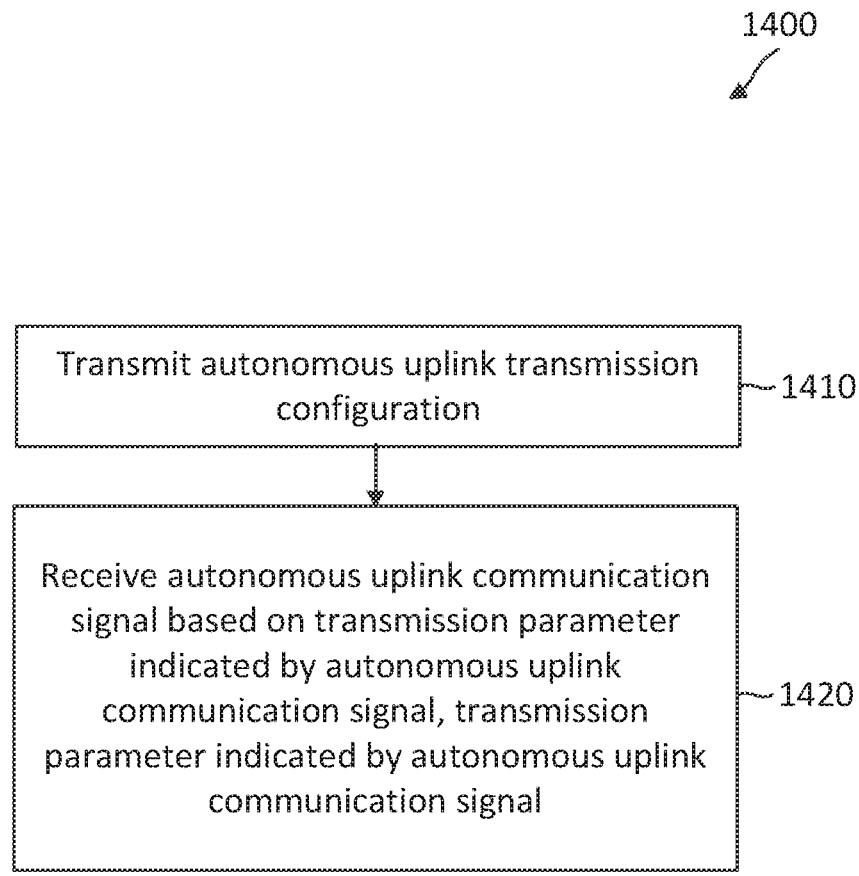
FIG. 14 is a flow diagram of a UE-initiated adaptive autonomous UL communication method according to embodiments of the present disclosure.

FIG. 14 is a flow diagram of a UE-initiated adaptive autonomous UL communication method 1400 according to embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the BSs 105 and 300, in a network, such as the network 100, may utilize one or more components, such as the processor 302, the memory 304, the autonomous UL communication module 308, the transceiver 310, and the one or more antennas 316, to execute the steps of method 1400. The method 1400 may employ similar mechanisms as in the methods 400, 500, 600, and 700 and the schemes 800, 900, and 1000 with respect to FIGS. 4, 5, 6, 7, 8, 9, and 10, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes transmitting, by a first wireless communication device (e.g., the BSs 105 and 300), an autonomous UL transmission configuration.

At step 1420, the method 1400 includes receiving, by the first wireless communication device from a second wireless communication device (e.g., the UEs 115 and 200), an autonomous UL communication signal (e.g., the autonomous UL communication signals 810, 910, 920, 1010, and 1020) based on a transmission parameter indicated by the autonomous UL communication signal. The transmission parameter is selected by the second wireless communication device from the autonomous UL transmission configuration based on a link adaptation parameter, for example, using the method 1300.

In an embodiment, the autonomous UL communication signal may include UCI carrying the transmission parameter.

The first wireless communication device may receive the UCI and obtain the transmission parameter from the UCI.

In an embodiment, the autonomous UL communication signal may be transmitted according to the transmission parameter, but may not include an explicit indicating of the transmission parameter in the UCI. In such an embodiment, the first wireless communication device may define a search space (e.g., various combinations of MCSs, RIs, PMIs, waveform types, and/or resources) based on the configuration and perform blind detection in the search space.

Figure 15:
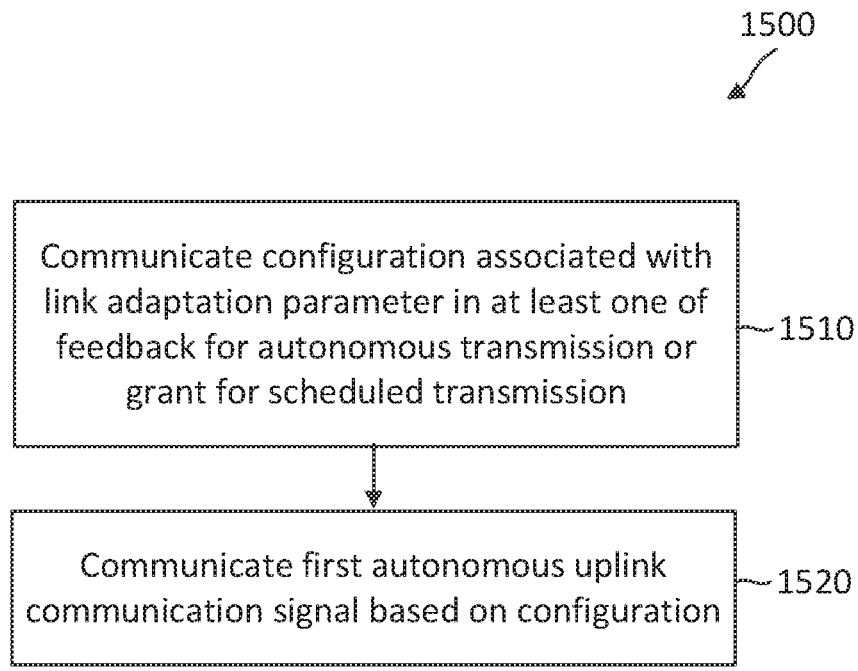
FIG. 15 is a flow diagram of a BS-initiated adaptive autonomous UL communication method according to embodiments of the present disclosure.

FIG. 15 is a flow diagram of a BS-initiated adaptive autonomous UL communication method 1500 according to embodiments of the present disclosure. Steps of the method 1500 can be executed by a computing device (e.g., a processor, processing circuit, and/or other suitable component) of a wireless communication device or other suitable means for performing the steps. For example, a wireless communication device, such as the BSs 105 and 300, in a network, such as the network 100 may utilize one or more components, such as the processor 302, the memory 304, the autonomous UL communication module 308, the transceiver 310, and the one or more antennas 316, to execute the steps of method 1500. The method 1500 may employ similar mechanisms as in the methods 1100 and 1200 with respect to FIGS. 11 and 12, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes communicating, communicating, by a first wireless communication device with a second wireless communication device, a configuration associated with a link adaptation parameter in at least one of a feedback for an autonomous transmission or a grant for a scheduled transmission. The link adaptation parameter may be associated with a channel state change and/or a traffic load. For example, the first wireless communication device may dynamically update the configuration when a link quality measure falls below a threshold, when a measured path loss exceeds a threshold, and/or when the traffic load exceeds a threshold.

At step 1520, the method 1500 includes communicating, by the first wireless communication device with the second wireless communication device, a first autonomous UL communication signal based on the configuration.

In some embodiments, the first wireless communication device may receive UCI from the second wireless communication device. The UCI may indicate transmission parameters (e.g., an MCS, an RI, a PMI, a waveform type, or a resource) used for the transmission of the first autonomous UL communication signal. The first wireless communication device may compare the UCI against the transmitted configuration to determine whether the second wireless communication device successfully received the configuration. When the UCI matches the configuration, the first wireless communication device may receive the first autonomous UL communication signal according to the configuration. Otherwise, the first wireless communication device may receive the autonomous UL communication signal based on the UCI (e.g., including a previously transmitted configuration).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising receiving, by a first wireless communication device from a second wireless communication device, an autonomous uplink transmission configuration; determining, by the first wireless communication device, a transmission parameter in response to a link adaptation parameter based on the autonomous uplink transmission configuration; and transmitting, by the first wireless communication device to the second wireless communication device, an autonomous uplink communication signal based on the determined transmission parameter.

In some embodiments, wherein the autonomous uplink transmission configuration includes at least one of a modulation coding scheme (MCS), a rank indicator (RI), a precoding matrix indicator (PMI), a waveform type, a resource allocation, or a transmission starting time, and wherein the determining includes selecting the transmission parameter from the autonomous uplink transmission configuration. In some embodiments, the method further comprises receiving, by the first wireless communication device from the second wireless communication device, a channel parameter associated with the link adaptation parameter, wherein the determining is further based on the received channel parameter. In some embodiments, the method further comprises receiving, by the first wireless communication device from the second wireless communication device, one or more downlink measurement signals; and determining, by the first wireless communication device, a path-loss based on the received one or more downlink measurement signals, wherein the determining the transmission parameter is further based on the path-loss associated with the link adaptation parameter. In some embodiments, the method further comprises transmitting, by the first wireless communication device to the second wireless communication device, one or more communication signals; receiving, by the first wireless communication device from the second wireless communication device, one or more feedbacks corresponding to the one or more communication signals; and determining, by the first wireless communication device, a feedback metric based at least one of a number of acknowledgements (ACKs) or a number of negative-acknowledgements (NACK) in the one or more feedbacks corresponding to the one or more communication signals, wherein the determining the transmission parameter is further based on the feedback metric associated with the link adaptation parameter. In some embodiments, wherein a first communication signal of the one or more communication signals includes a plurality of code blocks, and wherein the one or more feedbacks include a feedback for the plurality of code blocks. In some embodiments, wherein the link adaptation parameter includes at least one of a resource metric and a transmission power metric, and wherein the determining is further based on at least one of a transmission buffer status of the first wireless communication device associated with the resource metric or a power headroom parameter of the first wireless communication device associated with the transmission power metric. In some embodiments, wherein the autonomous uplink transmission configuration includes a first modulation coding scheme (MCS) and a second MCS, wherein the second MCS includes a lower order than the first MCS, and wherein the determining includes selecting the second MCS based on at least one of the transmission buffer status of the first wireless communication device being above a threshold; or the power headroom parameter of the first wireless communication device being above a threshold. In some embodiments, wherein the autonomous uplink transmission configuration includes a resource allocation indicating resources in one or more frequency bands during a time period, and wherein the determining includes selecting a subset of the resources based on at least one of the transmission buffer status of the first wireless communication device being above a threshold; or the power headroom parameter of the first wireless communication device being above a threshold. In some embodiments, wherein the autonomous uplink transmission configuration further includes at least one of a plurality of allowable starting transmission symbols or a plurality of allowable ending transmission symbols within the time period, and wherein the selecting is further based on the at least one of the plurality of allowable starting transmission symbols or the plurality of allowable ending transmission symbols. In some embodiments, the method further comprises performing, by the first wireless communication device, a listen-before-talk (LBT) in a spectrum shared by multiple network operating entities, wherein the determining is further based on a result of the LBT. In some embodiments, the method further comprises transmitting, by the first wireless communication device to the second wireless communication device, uplink control information including the determined transmission parameter.

Further embodiments of the present disclosure include a method of wireless communication, comprising transmitting, by a first wireless communication device, an autonomous uplink transmission configuration; and receiving, by the first wireless communication device from a second wireless communication device, an autonomous uplink communication signal based on a transmission parameter indicated by the autonomous uplink communication signal, the transmission parameter selected from the autonomous uplink transmission configuration based on a link adaptation parameter.

In some embodiments, wherein the autonomous uplink transmission configuration includes at least one of a modulation coding scheme (MCS), a rank indicator (RI), a precoding matrix indicator (PMI), a waveform type, a resource allocation, or a transmission starting time. In some embodiments, wherein the receiving includes performing blind detection based on the autonomous uplink transmission configuration. In some embodiments, wherein the autonomous uplink communication signal includes uplink control information including the transmission parameter.

Further embodiments of the present disclosure include a method of wireless communication, comprising communicating, by a first wireless communication device with a second wireless communication device, a configuration associated with a link adaptation parameter in at least one of a feedback for an autonomous transmission or a grant for a scheduled transmission; and communicating, by the first wireless communication device with the second wireless communication device, a first autonomous uplink communication signal based on the configuration.

In some embodiments, the method further comprises receiving, by the first wireless communication device from the second wireless communication device, uplink control information including a first modulation coding scheme (MCS); and determining, by the first wireless communication device, whether the first MCS in the uplink control information matches a second MCS in the configuration, wherein the first autonomous uplink communication signal is received based on the configuration when the first MCS matches the second MCS. In some embodiments, the method further comprises communicating, by the first wireless communication device with the second wireless communication device, a second autonomous uplink communication signal, wherein the communicating the configuration includes communicating the configuration in the feedback for the second autonomous uplink communication signal. In some embodiments, wherein the communicating the configuration includes communicating the configuration in the grant, and wherein the method further comprises communicating, by the first wireless communication device with the second wireless communication device, an uplink communication signal based on the grant.

Further embodiments of the present disclosure include an apparatus comprising a transceiver configured to receive, from a second wireless communication device, an autonomous uplink transmission configuration; and transmit, to the second wireless communication device, an autonomous uplink communication signal based on a transmission parameter; and a processor configured to determine the transmission parameter in response to a link adaptation parameter based on the autonomous uplink transmission configuration.

In some embodiments, wherein the autonomous uplink transmission configuration includes at least one of a modulation coding scheme (MCS), a rank indicator (RI), a precoding matrix indicator (PMI), a waveform type, a resource allocation, or a transmission starting time, and wherein the processor is further configured to determine the transmission parameter by selecting the transmission parameter from the autonomous uplink transmission configuration. In some embodiments, wherein the transceiver is further configured to receive, from the second wireless communication device, a channel parameter associated with the link adaptation parameter, and wherein the processor is further configured to determining the transmission parameter further based on the received channel parameter. In some embodiments, wherein the transceiver is further configured to receive, from the second wireless communication device, one or more downlink measurement signals, wherein the processor is further configured to determine a path-loss based on the received one or more downlink measurement signals; and determine the transmission parameter further based on the path-loss associated with the link adaptation parameter. In some embodiments, wherein the transceiver is further configured to transmit, to the second wireless communication device, one or more communication signals; receive, from the second wireless communication device, one or more feedbacks corresponding to the one or more communication signals, and wherein the processor is further configured to determine a feedback metric based at least one of a number of acknowledgements (ACKs) or a number of negative-acknowledgements (NACK) in the one or more feedbacks corresponding to the one or more communication signals; and determine the transmission parameter further based on the feedback metric associated with the link adaptation parameter. In some embodiments, wherein a first communication signal of the one or more communication signals includes a plurality of code blocks, and wherein the one or more feedbacks include a feedback for the plurality of code blocks. In some embodiments, wherein the link adaptation parameter includes at least one of a resource metric and a transmission power metric, and wherein the processor is further configured to determine the transmission parameter further based on at least one of a transmission buffer status of the apparatus associated with the resource metric or a power headroom parameter of the apparatus associated with the transmission power metric. In some embodiments, wherein the autonomous uplink transmission configuration includes a first modulation coding scheme (MCS) and a second MCS, wherein the second MCS includes a lower order than the first MCS, and wherein the processor is further configured to determine the transmission parameter by selecting the second MCS based on at least one of the transmission buffer status of the apparatus being above a threshold; or the power headroom parameter of the apparatus being above a threshold. In some embodiments, wherein the autonomous uplink transmission configuration includes a resource allocation indicating resources in one or more frequency bands during a time period, and wherein the processor is further configured to determine the transmission parameter by selecting a subset of the resources based on at least one of the transmission buffer status of the apparatus being above a threshold; or the power headroom parameter of the apparatus being above a threshold. In some embodiments, wherein the autonomous uplink transmission configuration further includes at least one of a plurality of allowable starting transmission symbols or a plurality of allowable ending transmission symbols within the time period, and wherein the processor is further configured to select the subset of the resources further based on the at least one of the plurality of allowable starting transmission symbols or the plurality of allowable ending transmission symbols. In some embodiments, wherein the processor is further configured to perform a listen-before-talk (LBT) in a spectrum shared by multiple network operating entities; and determine the transmission parameter further based on a result of the LBT. In some embodiments, wherein the transceiver is further configured to transmit, to the second wireless communication device, uplink control information including the determined transmission parameter.

Further embodiments of the present disclosure include an apparatus comprising a transceiver configured to transmit an autonomous uplink transmission configuration; and receive, from a second wireless communication device, an autonomous uplink communication signal based on a transmission parameter indicated by the autonomous uplink communication signal, the transmission parameter selected from the autonomous uplink transmission configuration based on a link adaptation parameter.

In some embodiments, wherein the autonomous uplink transmission configuration includes at least one of a modulation coding scheme (MCS), a rank indicator (RI), a precoding matrix indicator (PMI), a waveform type, a resource allocation, or a transmission starting time. In some embodiments, wherein the transceiver is further configured to receive the transmission parameter by performing blind detection based on the autonomous uplink transmission configuration. In some embodiments, wherein the autonomous uplink communication signal includes uplink control information including the transmission parameter.

Further embodiments of the present disclosure include an apparatus comprising a transceiver configured to communicate, with a second wireless communication device, a configuration associated with a link adaptation parameter in at least one of a feedback for an autonomous transmission or a grant for a scheduled transmission; and communicate, with the second wireless communication device, a first autonomous uplink communication signal based on the configuration.

In some embodiments, wherein the transceiver is further configured to receive, from the second wireless communication device, uplink control information including a first modulation coding scheme (MCS), wherein the apparatus further comprises a processor configured to determine whether the first MCS in the uplink control information matches a second MCS in the configuration, and wherein the first autonomous uplink communication signal is received based on the configuration when the first MCS matches the second MCS. In some embodiments, wherein the transceiver is further configured to communicate, with the second wireless communication device, a second autonomous uplink communication signal; and communicate the configuration by communicating the configuration in the feedback for the second autonomous uplink communication signal. In some embodiments, the apparatus further comprises a processor configured to communicate the configuration by communicating the configuration in the grant; and communicate, with the second wireless communication device, an uplink communication signal based on the grant.

Further embodiments of the present disclosure include a computer-readable medium having program code recorded thereon, the program code comprising code for causing a first wireless communication device to receive, from a second wireless communication device, an autonomous uplink transmission configuration; code for causing the first wireless communication device to determine a transmission parameter in response to a link adaptation parameter based on the autonomous uplink transmission configuration; and code for causing the first wireless communication device to transmit, to the second wireless communication device, an autonomous uplink communication signal based on the determined transmission parameter.

In some embodiments, wherein the autonomous uplink transmission configuration includes at least one of a modulation coding scheme (MCS), a rank indicator (RI), a precoding matrix indicator (PMI), a waveform type, a resource allocation, or a transmission starting time, and wherein the code for causing the first wireless communication device to determine the transmission parameter is further configured to select the transmission parameter from the autonomous uplink transmission configuration. In some embodiments, the computer-readable medium further comprises code for causing the first wireless communication device to receive, from the second wireless communication device, a channel parameter associated with the link adaptation parameter, wherein the code for causing the first wireless communication device to determine the transmission parameter is further configured to determine the transmission parameter based on the received channel parameter. In some embodiments, the computer-readable medium further comprises code for causing the first wireless communication device to receive, from the second wireless communication device, one or more downlink measurement signals; and code for causing the first wireless communication device to determine a path-loss based on the received one or more downlink measurement signals, wherein the code for causing the first wireless communication device to determine the transmission is further configured to determine the transmission parameter based on the path-loss associated with the link adaptation parameter. In some embodiments, the computer-readable medium further comprises code for causing the first wireless communication device to transmit, to the second wireless communication device, one or more communication signals; code for causing the first wireless communication device to receive, from the second wireless communication device, one or more feedbacks corresponding to the one or more communication signals; and code for causing the first wireless communication device to determine a feedback metric based at least one of a number of acknowledgements (ACKs) or a number of negative-acknowledgements (NACK) in the one or more feedbacks corresponding to the one or more communication signals, wherein the code for causing the first wireless communication device to determine the transmission parameter is further configured to determine the transmission parameter based on the feedback metric associated with the link adaptation parameter. In some embodiments, wherein a first communication signal of the one or more communication signals includes a plurality of code blocks, and wherein the one or more feedbacks include a feedback for the plurality of code blocks. In some embodiments, wherein the link adaptation parameter includes at least one of a resource metric and a transmission power metric, and wherein the code for causing the first wireless communication device to determine the transmission parameter is further configured to determine the transmission parameter based on at least one of a transmission buffer status of the first wireless communication device associated with the resource metric or a power headroom parameter of the first wireless communication device associated with the transmission power metric. In some embodiments, wherein the autonomous uplink transmission configuration includes a first modulation coding scheme (MCS) and a second MCS, wherein the second MCS includes a lower order than the first MCS, and wherein the code for causing the first wireless communication device to determine the transmission parameter is further configured to determine the transmission parameter by selecting the second MCS based on at least one of the transmission buffer status of the first wireless communication device being above a threshold; or the power headroom parameter of the first wireless communication device being above a threshold. In some embodiments, wherein the autonomous uplink transmission configuration includes a resource allocation indicating resources in one or more frequency bands during a time period, and wherein the code for causing the first wireless communication device to determine the transmission parameter is further configured to determine the transmission parameter by selecting a subset of the resources based on at least one of the transmission buffer status of the first wireless communication device being above a threshold; or the power headroom parameter of the first wireless communication device being above a threshold. In some embodiments, wherein the autonomous uplink transmission configuration further includes at least one of a plurality of allowable starting transmission symbols or a plurality of allowable ending transmission symbols within the time period, and wherein the code for causing the first wireless communication device to determine the transmission parameter is further configured to select the subset of the resources further based on the at least one of the plurality of allowable starting transmission symbols or the plurality of allowable ending transmission symbols. In some embodiments, the computer-readable medium further comprises code for causing the first wireless communication device to perform a listen-before-talk (LBT) in a spectrum shared by multiple network operating entities, wherein the code for causing the first wireless communication device to determine the transmission parameter is further configured to determine the transmission parameter further based on a result of the LBT. In some embodiments, the computer-readable medium further comprises code for causing the first wireless communication device to transmit, to the second wireless communication device, uplink control information including the determined transmission parameter.

Further embodiments of the present disclosure include a computer-readable medium having program code recorded thereon, the program code comprising code for causing a first wireless communication device to transmit an autonomous uplink transmission configuration; and code for causing the first wireless communication device to receive, from a second wireless communication device, an autonomous uplink communication signal based on a transmission parameter indicated by the autonomous uplink communication signal, the transmission parameter selected from the autonomous uplink transmission configuration based on a link adaptation parameter.

In some embodiments, wherein the autonomous uplink transmission configuration includes at least one of a modulation coding scheme (MCS), a rank indicator (RI), a precoding matrix indicator (PMI), a waveform type, a resource allocation, or a transmission starting time. In some embodiments, wherein the code for causing the first wireless communication device to receive the transmission parameter is further configured to perform blind detection based on the autonomous uplink transmission configuration. In some embodiments, wherein the autonomous uplink communication signal includes uplink control information including the transmission parameter.

Further embodiments of the present disclosure include a computer-readable medium having program code recorded thereon, the program code comprising code for causing a first wireless communication device to communicate, with a second wireless communication device, a configuration associated with a link adaptation parameter in at least one of a feedback for an autonomous transmission or a grant for a scheduled transmission; and code for causing the first wireless communication device to communicate, with the second wireless communication device, a first autonomous uplink communication signal based on the configuration.

In some embodiments, the computer-readable medium further comprises code for causing the first wireless communication device to receive, from the second wireless communication device, uplink control information including a first modulation coding scheme (MCS); and code for causing the first wireless communication device to determine whether the first MCS in the uplink control information matches a second MCS in the configuration, wherein the first autonomous uplink communication signal is received based on the configuration when the first MCS matches the second MCS. In some embodiments, the computer-readable medium further comprises code for causing the first wireless communication device to communicate, with the second wireless communication device, a second autonomous uplink communication signal, wherein the code for causing the first wireless communication device to communicate the configuration is further configured to communicate the configuration in the feedback for the second autonomous uplink communication signal. In some embodiments, wherein the code for causing the first wireless communication device to communicate the configuration is further configured to communicate the configuration in the grant, and wherein the computer-readable medium further comprises code for causing the first wireless communication device to communicate, with the second wireless communication device, an uplink communication signal based on the grant.

Further embodiments of the present disclosure include an apparatus comprising means for receiving, from a second wireless communication device, an autonomous uplink transmission configuration; means for determining a transmission parameter in response to a link adaptation parameter based on the autonomous uplink transmission configuration; and means for transmitting, to the second wireless communication device, an autonomous uplink communication signal based on the determined transmission parameter.

In some embodiments, wherein the autonomous uplink transmission configuration includes at least one of a modulation coding scheme (MCS), a rank indicator (RI), a pre-coding matrix indicator (PMI), a waveform type, a resource allocation, or a transmission starting time, and wherein the means for determining the transmission is further configured to select the transmission parameter from the autonomous uplink transmission configuration. In some embodiments, the apparatus further comprises means for receiving, from the second wireless communication device, a channel parameter associated with the link adaptation parameter, wherein the means for determining the transmission parameter is further configured to determine the transmission parameter based on the received channel parameter. In some embodiments, the apparatus further comprises means for receiving, from the second wireless communication device, one or more downlink measurement signals; and means for determining a path-loss based on the received one or more downlink measurement signals, wherein the means for determining the transmission is further configured to determine the transmission parameter based on the path-loss associated with the link adaptation parameter. In some embodiments, the apparatus further comprises means for transmitting, to the second wireless communication device, one or more communication signals; means for receiving, from the second wireless communication device, one or more feedbacks corresponding to the one or more communication signals; and means for determining a feedback metric based at least one of a number of acknowledgements (ACKs) or a number of negative-acknowledgements (NACK) in the one or more feedbacks corresponding to the one or more communication signals, wherein the means for determining the transmission parameter is further configured to determine the transmission parameter based on the feedback metric associated with the link adaptation parameter. In some embodiments, wherein a first communication signal of the one or more communication signals includes a plurality of code blocks, and wherein the one or more feedbacks include a feedback for the plurality of code blocks. In some embodiments, wherein the link adaptation parameter includes at least one of a resource metric and a transmission power metric, and wherein the means for determining the transmission parameter is further configured to determine the transmission parameter based on at least one of a transmission buffer status of the apparatus associated with the resource metric or a power headroom parameter of the apparatus associated with the transmission power metric. In some embodiments, wherein the autonomous uplink transmission configuration includes a first modulation coding scheme (MCS) and a second MCS, wherein the second MCS includes a lower order than the first MCS, and wherein the means for determining the transmission parameter is further configured to determine the transmission parameter by selecting the second MCS based on at least one of the transmission buffer status of the apparatus being above a threshold; or the power headroom parameter of the apparatus being above a threshold. In some embodiments, wherein the autonomous uplink transmission configuration includes a resource allocation indicating resources in one or more frequency bands during a time period, and wherein the means for determining the transmission parameter is further configured to determine the transmission parameter by selecting a subset of the resources based on at least one of the transmission buffer status of the apparatus being above a threshold; or the power headroom parameter of the apparatus being above a threshold. In some embodiments, wherein the autonomous uplink transmission configuration further includes at least one of a plurality of allowable starting transmission symbols or a plurality of allowable ending transmission symbols within the time period, and wherein the means for determining the transmission parameter is further configured to select the subset of the resources further based on the at least one of the plurality of allowable starting transmission symbols or the plurality of allowable ending transmission symbols. In some embodiments, the apparatus further comprises means for performing a listen-before-talk (LBT) in a spectrum shared by multiple network operating entities, wherein the means for determining the transmission parameter is further configured to determine the transmission parameter further based on a result of the LBT. In some embodiments, the apparatus further comprising means for transmitting, to the second wireless communication device, uplink control information including the determined transmission parameter.

Further embodiments of the present disclosure include an apparatus comprising means for transmitting an autonomous uplink transmission configuration; and means for receiving, from a second wireless communication device, an autonomous uplink communication signal based on a transmission parameter indicated by the autonomous uplink communication signal, the transmission parameter selected from the autonomous uplink transmission configuration based on a link adaptation parameter.

In some embodiments, wherein the autonomous uplink transmission configuration includes at least one of a modulation coding scheme (MCS), a rank indicator (RI), a pre-coding matrix indicator (PMI), a waveform type, a resource allocation, or a transmission starting time. In some embodiments, wherein the means for receiving the transmission parameter is further configured to perform blind detection based on the autonomous uplink transmission configuration. In some embodiments, wherein the autonomous uplink communication signal includes uplink control information including the transmission parameter.

Further embodiments of the present disclosure include an apparatus comprising means for communicating, with a second wireless communication device, a configuration associated with a link adaptation parameter in at least one of a feedback for an autonomous transmission or a grant for a scheduled transmission; and means for communicating, with the second wireless communication device, a first autonomous uplink communication signal based on the configuration.

In some embodiments, the apparatus further comprises means for receiving, from the second wireless communication device, uplink control information including a first modulation coding scheme (MCS); and means for determining whether the first MCS in the uplink control information matches a second MCS in the configuration, wherein the first autonomous uplink communication signal is received based on the configuration when the first MCS matches the second MCS. In some embodiments, the apparatus further comprises means for communicating, with the second wireless communication device, a second autonomous uplink communication signal, wherein the means for communicating the configuration is further configured to communicate the configuration in the feedback for the second autonomous uplink communication signal. In some embodiments, wherein the means for communicating the configuration is further configured to communicate the configuration in the grant, and wherein the apparatus further comprises means for communicating, with the second wireless communication device, an uplink communication signal based on the grant.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a first wireless communication device from a second wireless communication device, an autonomous uplink transmission configuration;
   determining, by the first wireless communication device in response to the autonomous uplink transmission configuration and a link adaptation parameter associated with at least one of a path loss or a channel estimate, a transmission parameter including at least one of a modulation coding scheme (MCS), a pre-coding matrix indicator (PMI), or a rank indicator (RI); and
   transmitting, by the first wireless communication device to the second wireless communication device, an autonomous uplink communication signal based on the determined transmission parameter.

2. The method of claim 1, wherein the autonomous uplink transmission configuration includes at least one of a second MCS, a second RI, a second PMI, a waveform type, a resource allocation, or a transmission starting time, and wherein the determining includes:
   selecting the transmission parameter from the autonomous uplink transmission configuration.

3. The method of claim 1, further comprising:
   receiving, by the first wireless communication device from the second wireless communication device, a channel parameter associated with the link adaptation parameter, the channel parameter including at least one of noise information, interference information, or acknowledgement/negative-acknowledgement (ACK/NACK) feedback information,
   wherein the determining is further based on the received channel parameter.

4. The method of claim 1, further comprising:
   receiving, by the first wireless communication device from the second wireless communication device, one or more downlink measurement signals,
   wherein the determining the transmission parameter includes:
      determining, by the first wireless communication device, the at least one of the MCS, the PMI, or the RI based on the one or more received downlink measurement signals associated with the link adaptation parameter.

5. The method of claim 4, wherein the one or more downlink measurement signals include at least one of a reference signal or a synchronization signal, or a broadcast system information signal.

6. The method of claim 4, further comprising:
   determining, by the first wireless communication device, the at least one of the path loss or the channel estimate based on the one or more received downlink measurement signals.

7. A method of wireless communication, comprising:
   receiving, by a first wireless communication device from a second wireless communication device, an autonomous uplink transmission configuration;
   transmitting, by the first wireless communication device to the second wireless communication device, one or more communication signals;
   receiving, by the first wireless communication device from the second wireless communication device, one or more feedbacks corresponding to the one or more communication signals;
   determining, by the first wireless communication device, a feedback metric based on at least one of a number of acknowledgements (ACKs) or a number of negative-acknowledgements (NACK) in the one or more feedbacks corresponding to the one or more communication signals;
   determining, by the first wireless communication device in response to the autonomous uplink transmission configuration and a link adaptation parameter associated with the feedback metric, a transmission parameter including at least one of a modulation coding scheme (MCS), a pre-coding matrix indicator (PMI), or a rank indicator (RI); and
   transmitting, by the first wireless communication device to the second wireless communication device, an autonomous uplink communication signal based on the determined transmission parameter.

8. The method of claim 1, wherein the link adaptation parameter includes at least one of a time-frequency resource metric and a transmission power metric, and wherein the determining is further based on at least one of:

a transmission buffer status of the first wireless communication device associated with the time-frequency resource metric; or a power headroom parameter of the first wireless communication device associated with the transmission power metric.

9. The method of claim 1,
wherein the autonomous uplink transmission configuration further includes at least one of a plurality of allowable starting transmission symbols or a plurality of allowable ending transmission symbols within a time period,
wherein the method further comprises:
performing, by the first wireless communication device, a listen-before-talk (LBT) in a spectrum shared by multiple network operating entities, and wherein the determining includes:
selecting, by the first wireless communication device, a starting time for transmitting the autonomous uplink communication signal based on the LBT and the at least one of the plurality of allowable starting transmission symbols or the plurality of allowable ending transmission symbols.

10. The method of claim 1, further comprising:
transmitting, by the first wireless communication device to the second wireless communication device, uplink control information including information associated with the determined transmission parameter.

11. The method of claim 1, further comprising:
determining, by the first wireless communication device, a demodulation reference signal (DMRS) configuration including at least one of time-frequency resources, a DMRS sequence parameter, or a DMRS port parameter based on the determined transmission parameter,
wherein the transmitting includes:
transmitting, by the first wireless communication device to the second wireless communication device, a DMRS based on the determined DMRS configuration.

12. The method of claim 1, further comprising:
receiving, by the first wireless communication device from the second wireless communication device, an updated autonomous uplink transmission configuration in at least one of a radio resource control (RRC) message, downlink control information (DCI), or a feedback associated with the autonomous uplink communication signal; and
transmitting, by the first wireless communication device to the second wireless communication device after transmitting the autonomous uplink communication signal, another autonomous uplink communication signal based on the updated autonomous uplink transmission configuration.

13. The method of claim 12, wherein the receiving the updated autonomous uplink transmission configuration includes:
receiving, by the first wireless communication device from the second wireless communication device, the DCI including the updated autonomous uplink transmission configuration and at least one of the feedback associated with the autonomous uplink communication signal, a scheduling grant for a scheduled uplink transmission, or an autonomous uplink transmission activation/deactivation.

14. The method of claim 7, further comprising:
transmitting, by the first wireless communication device to the second wireless communication device, uplink control information including information associated with the determined transmission parameter.

15. An apparatus comprising:
a transceiver configured to:
receive, from a second wireless communication device, an autonomous uplink transmission configuration; and
transmit, to the second wireless communication device, an autonomous uplink communication signal based on a transmission parameter; and
a processor configured to determine, in response to the autonomous uplink transmission configuration and a link adaptation parameter associated with at least one of a path loss or a channel estimate, the transmission parameter including at least one of a modulation coding scheme (MCS), a pre-coding matrix indicator (PMI), or a rank indicator (RI).

16. The apparatus of claim 15, wherein the autonomous uplink transmission configuration includes at least one of a second MCS, a second RI, a second PMI, a waveform type, a resource allocation, or a transmission starting time, and wherein the processor is further configured to:
determine the transmission parameter by selecting the transmission parameter from the autonomous uplink transmission configuration.

17. The apparatus of claim 15,
wherein the transceiver is further configured to:
receive, from the second wireless communication device, a channel parameter associated with the link adaptation parameter, the channel parameter including at least one of noise information, interference information, or acknowledgement/negative-acknowledgement (ACK/NACK) feedback information, and wherein the processor is further configured to:
determine the transmission parameter further based on the received channel parameter.

18. The apparatus of claim 15,
wherein the transceiver is further configured to:
receive, from the second wireless communication device, one or more downlink measurement signals including at least one of a reference signal, a synchronization signal, or a broadcast system information signal, and wherein the processor is further configured to:
determine the transmission parameter by determining the at least one of the MCS, the PMI, or the RI based on the one or more received downlink measurement signals associated with the link adaptation parameter.

19. The apparatus of claim 15, wherein the link adaptation parameter includes at least one of a time-frequency resource metric and a transmission power metric, and wherein the processor is further configured to:
determine the transmission parameter further based on at least one of a transmission buffer status of the apparatus associated with the time-frequency resource metric or a power headroom parameter of the apparatus associated with the transmission power metric.

20. The apparatus of claim 15, wherein the processor is further configured to:
perform a listen-before-talk (LBT) in a spectrum shared by multiple network operating entities; and
determine the transmission parameter further based on a result of the LBT.

21. The apparatus of claim 15, wherein the transceiver is further configured to:

transmit, to the second wireless communication device, uplink control information including information associated with the determined transmission parameter.

22. An apparatus comprising:
a transceiver configured to:
receive, from a second wireless communication device, an autonomous uplink transmission configuration;
transmit, to the second wireless communication device, one or more communication signals;
receive, from the second wireless communication device, one or more feedbacks corresponding to the one or more communication signals;
transmit, to the second wireless communication device, an autonomous uplink communication signal based on a transmission parameter; and
a processor configured to
determine a feedback metric based at least one of a number of acknowledgements (ACKs) or a number of negative-acknowledgements (NACK) in the one or more feedbacks corresponding to the one or more communication signals; and
determine, in response to the autonomous uplink transmission configuration and a link adaptation parameter associated with the feedback metric, the transmission parameter including at least one of a modulation coding scheme (MCS), a pre-coding matrix indicator (PMI), or a rank indicator (RI).

23. The apparatus of claim 22, wherein the transceiver is further configured to:
transmit, to the second wireless communication device, uplink control information including information associated with the determined transmission parameter.

24. A non-transitory computer-readable medium having program code recorded thereon, the program code comprising:
code for causing a first wireless communication device to receive, from a second wireless communication device, an autonomous uplink transmission configuration;
code for causing the first wireless communication device to transmit, to the second wireless communication device, an autonomous uplink communication signal based on a transmission parameter; and
code for causing the first wireless communication device to determine, in response to the autonomous uplink transmission configuration and a link adaptation parameter associated with at least one of a path loss or a channel estimate, the transmission parameter including at least one of a modulation coding scheme (MCS), a pre-coding matrix indicator (PMI), or a rank indicator (RI).

25. The non-transitory computer-readable medium of claim 24, wherein the autonomous uplink transmission configuration includes at least one of a second MCS, a second RI, a second PMI, a waveform type, a resource allocation, or a transmission starting time, further comprising:
code for causing the first wireless communication device to determine the transmission parameter by selecting the transmission parameter from the autonomous uplink transmission configuration.

26. The non-transitory computer-readable medium of claim 24, further comprising:
code for causing the first wireless communication device to receive, from the second wireless communication device, a channel parameter associated with the link adaptation parameter, the channel parameter including at least one of noise information, interference information, or acknowledgement/negative-acknowledgement (ACK/NACK) feedback information; and
code for causing the first wireless communication device to determine the transmission parameter further based on the received channel parameter.

27. The non-transitory computer-readable medium of claim 24, further comprising:
code for causing the first wireless communication device to receive, from the second wireless communication device, one or more downlink measurement signals including at least one of a reference signal, a synchronization signal, or a broadcast system information signal; and
code for causing the first wireless communication device to determine the transmission parameter by determining the at least one of the MCS, the PMI, or the RI based on the one or more received downlink measurement signals associated with the link adaptation parameter.

28. The non-transitory computer-readable medium of claim 24, wherein the link adaptation parameter includes at least one of a time-frequency resource metric and a transmission power metric, further comprising:
code for causing the first wireless communication device to determine the transmission parameter further based on at least one of a transmission buffer status of the first wireless communication device associated with the time-frequency resource metric or a power headroom parameter of the first wireless communication device associated with the transmission power metric.

29. The non-transitory computer-readable medium of claim 24, further comprising:
code for causing the first wireless communication device to perform a listen-before-talk (LBT) in a spectrum shared by multiple network operating entities; and
code for causing the first wireless communication device to determine the transmission parameter further based on a result of the LBT.

30. The non-transitory computer-readable medium of claim 24, further comprising:
code for causing the first wireless communication device to transmit, to the second wireless communication device, uplink control information including information associated with the determined transmission parameter.

31. The non-transitory computer-readable medium of claim 24, further comprising:
code for causing the first wireless communication device to determine a demodulation reference signal (DMRS) configuration including at least one of time-frequency resources, a DMRS sequence parameter, or a DMRS port parameter based on the determined transmission parameter,
wherein the code for causing the first wireless communication device to transmit the autonomous uplink communication signal is further configured to:
transmit, to the second wireless communication device, a DMRS based on the determined DMRS configuration.

32. A non-transitory computer-readable medium having program code recorded thereon, the program code comprising:
code for causing a first wireless communication device to receive, from a second wireless communication device, an autonomous uplink transmission configuration;

code for causing the first wireless communication device to transmit, to the second wireless communication device, one or more communication signals;

code for causing the first wireless communication device to receive, from the second wireless communication device, one or more feedbacks corresponding to the one or more communication signals;

code for causing the first wireless communication device to determine a feedback metric based at least one of a number of acknowledgements (ACKs) or a number of negative-acknowledgements (NACK) in the one or more feedbacks corresponding to the one or more communication signals;

code for causing the first wireless communication device to determine, in response to the autonomous uplink transmission configuration and a link adaptation parameter associated with the feedback metric, a transmission parameter including at least one of a modulation coding scheme (MCS), a pre-coding matrix indicator (PMI), or a rank indicator (RI); and code for causing the first wireless communication device to transmit, to the second wireless communication device, an autonomous uplink communication signal based on the determined transmission parameter.

33. The non-transitory computer-readable medium of claim 32, further comprising: code for causing the first wireless communication device to transmit, to the second wireless communication device, uplink control information including information associated with the determined transmission parameter.

* * * * *